United States Patent [19]
Davis et al.

[11] Patent Number: 5,995,213
[45] Date of Patent: Nov. 30, 1999

[54] LENS INSPECTION SYSTEM

[75] Inventors: Thomas G. Davis; Joseph Wilder, both of Princeton, N.J.; David Dreyfuss, Kettering, Ohio

[73] Assignee: Johnson & Johnson Vision Products, Inc., Jasksonville, Fla.

[21] Appl. No.: 08/968,031

[22] Filed: Nov. 12, 1997

Related U.S. Application Data

[63] Continuation of application No. 08/757,334, Nov. 27, 1996, Pat. No. 5,805,876, which is a continuation of application No. 08/622,022, Mar. 27, 1996, abandoned, which is a continuation of application No. 08/506,595, Jul. 25, 1995, abandoned, which is a continuation of application No. 08/374,407, Jan. 17, 1995, abandoned.

[51] Int. Cl.$^6$ ........................................................ G01B 9/00
[52] U.S. Cl. ................................................................ 356/124
[58] Field of Search ................................... 356/124–127, 356/237, 239, 240, 430, 244, 246; 264/2.6; 250/562, 572; 358/101, 106, 107; 582/8, 65

*Primary Examiner*—Hoa Q. Pham

[57] ABSTRACT

A system for inspecting ophthalmic lenses and including transport, illumination, imaging and image processing subsystems. The transport system moves a multitude of ophthalmic lenses along a predetermined path to move each of those lenses, one at a time, into a lens inspection position, and the illumination subsystem generates a series of light pulses and directs a respective one light pulse through each ophthalmic lens. The imaging subsystem generates a set of signals representing selected portions of the light pulses transmitted through the ophthalmic lenses, and the image processing subsystem receives those signals from the imaging subsystem and processes those signals according to a predetermined program to identify at least one condition of each of the lenses.

14 Claims, 36 Drawing Sheets

FIG. 2
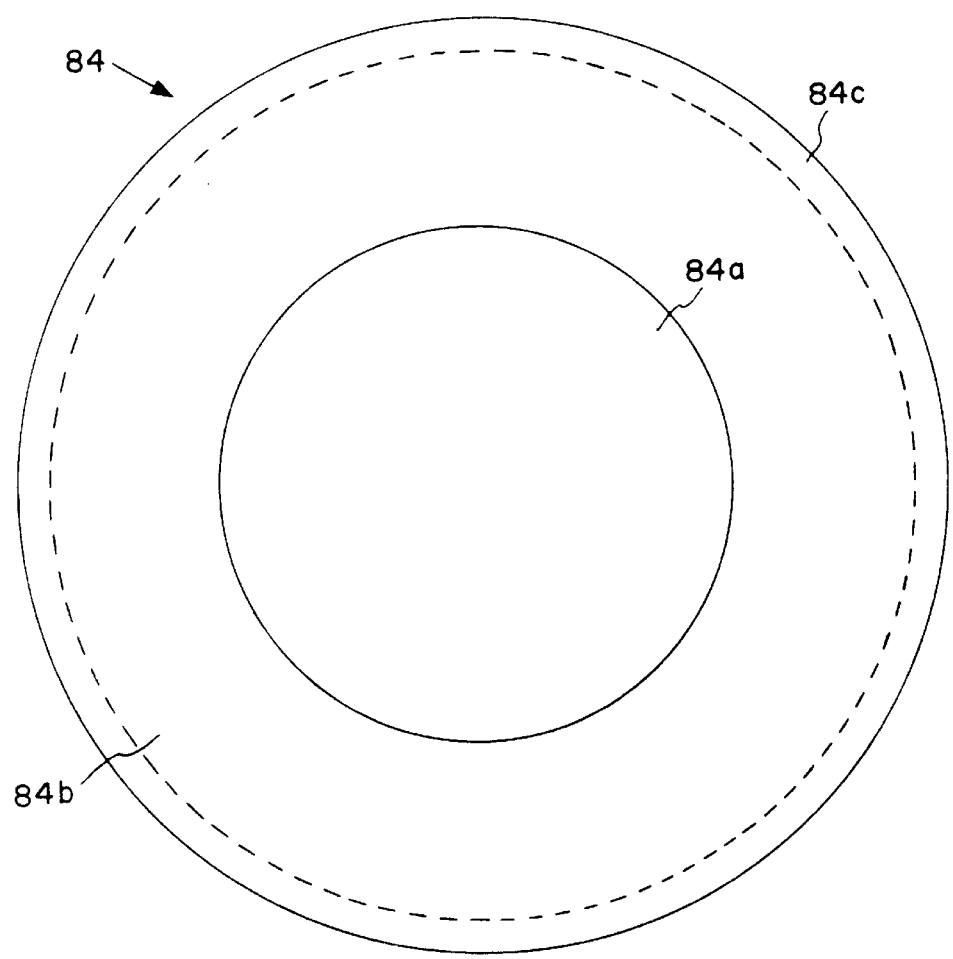
FIG. 3
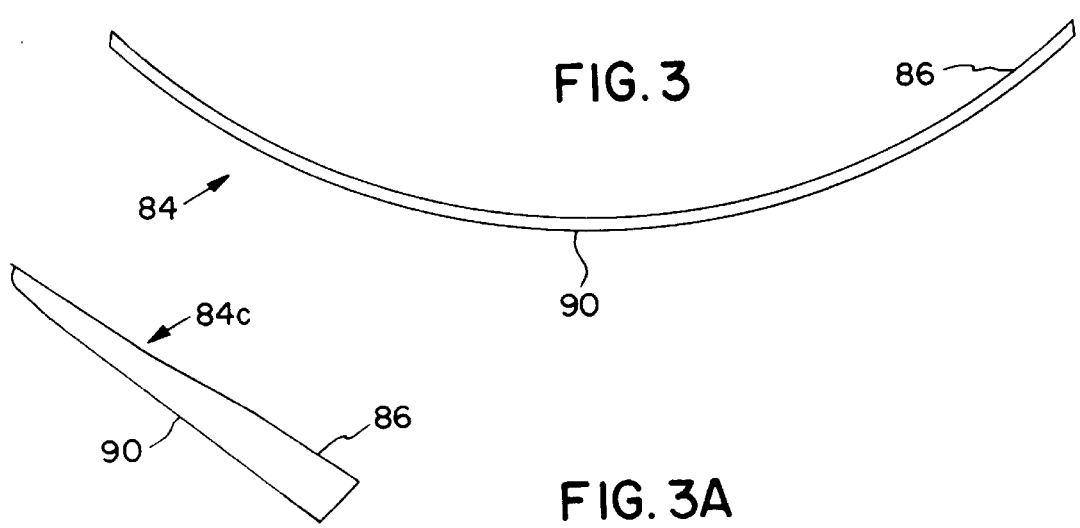
FIG. 3A

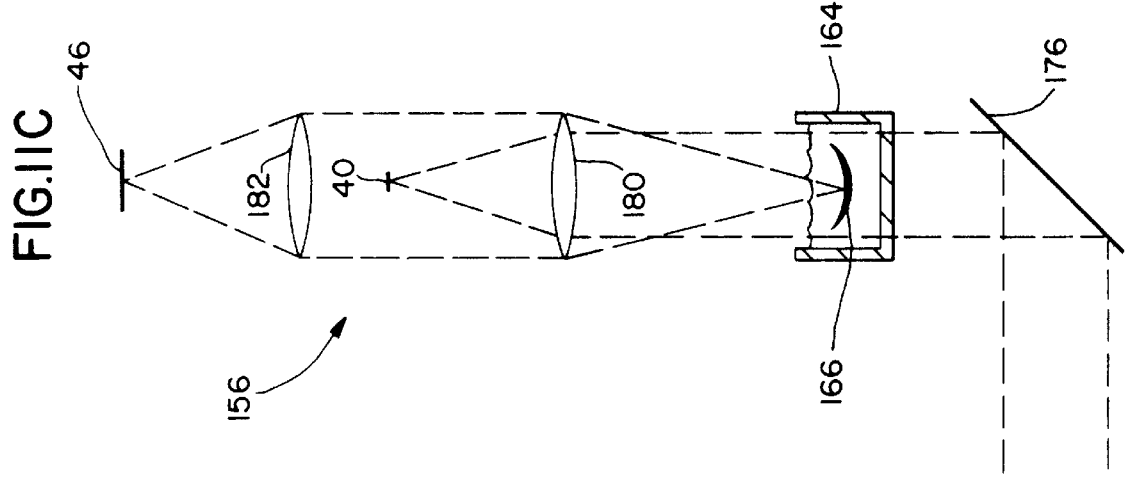
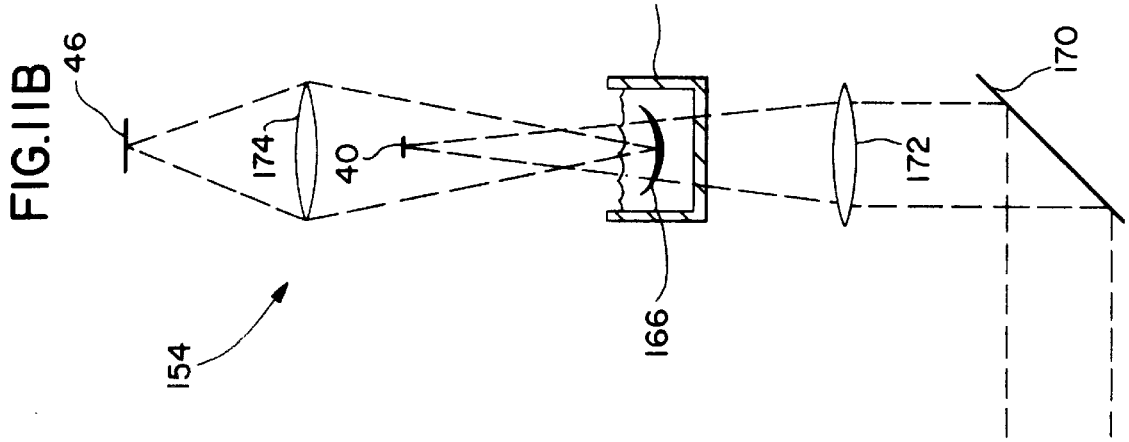
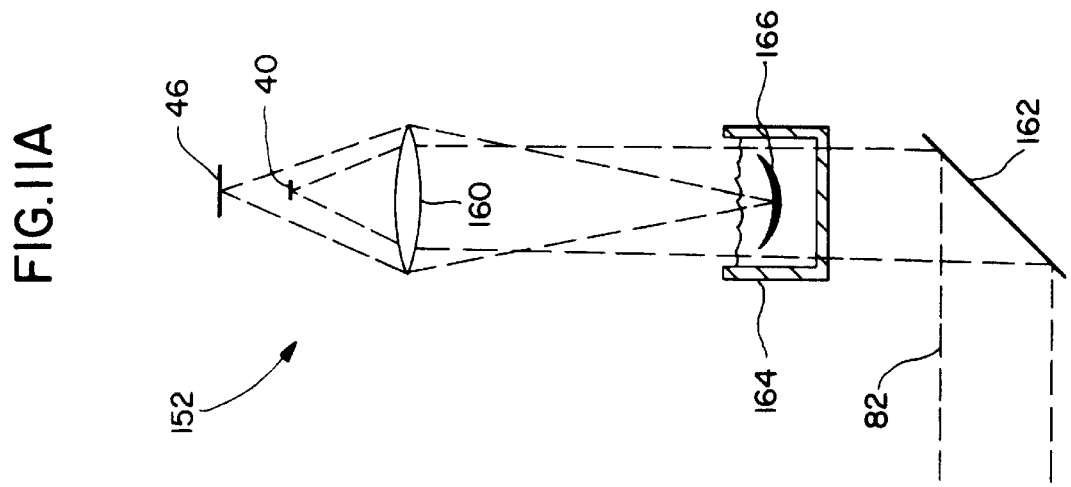

START

STARTING WITH THE $I_q$ VALUES FOR THE PIXELS, PERFORM MAX, PMAX, PMAX, MAX, MAX, PMAX, PMAX, MIN, PMIN, PMIN, MIN, MIN, PMIN, PMIN OPERATIONS TO PRODUCE $I_{10}$ VALUES

EXIT

FIG.34A

| | 1 | 2 | 3 | 4 | 5 | 6 | 7 |
|---|---|---|---|---|---|---|---|
| 7 | 0 | 0 | 0 | 0 | 0 | 0 | 0 |
| 6 | 0 | 0 | 0 | 0 | 0 | 0 | 0 |
| 5 | 0 | 0 | 0 | 0 | 0 | 0 | 0 |
| 4 | 0 | 7 | 7 | 7 | 7 | 0 | 0 |
| 3 | 7 | 7 | 7 | 7 | 7 | 0 | 0 |
| 2 | 7 | 7 | 7 | 7 | 0 | 0 | 0 |
| 1 | 7 | 7 | 7 | 0 | 0 | 0 | 0 |

FIG.34B
MAX

| | 1 | 2 | 3 | 4 | 5 | 6 | 7 |
|---|---|---|---|---|---|---|---|
| 7 | 0 | 0 | 0 | 0 | 0 | 0 | 0 |
| 6 | 0 | 7 | 7 | 7 | 7 | 0 | 0 |
| 5 | 7 | 7 | 7 | 7 | 7 | 7 | 0 |
| 4 | 7 | 7 | 7 | 7 | 7 | 7 | 0 |
| 3 | 7 | 7 | 7 | 7 | 7 | 7 | 0 |
| 2 | 7 | 7 | 7 | 7 | 7 | 7 | 0 |
| 1 | 7 | 7 | 7 | 7 | 7 | 0 | 0 |

FIG.34C
PMAX

| | 1 | 2 | 3 | 4 | 5 | 6 | 7 |
|---|---|---|---|---|---|---|---|
| 7 | 0 | 0 | 0 | 0 | 0 | 0 | 0 |
| 6 | 0 | 0 | 7 | 7 | 0 | 0 | 0 |
| 5 | 0 | 7 | 7 | 7 | 7 | 0 | 0 |
| 4 | 7 | 7 | 7 | 7 | 7 | 7 | 0 |
| 3 | 7 | 7 | 7 | 7 | 7 | 7 | 0 |
| 2 | 7 | 7 | 7 | 7 | 7 | 0 | 0 |
| 1 | 7 | 7 | 7 | 7 | 0 | 0 | 0 |

FIG.34D
MIN

| | 1 | 2 | 3 | 4 | 5 | 6 | 7 |
|---|---|---|---|---|---|---|---|
| 7 | 0 | 0 | 0 | 0 | 0 | 0 | 0 |
| 6 | 0 | 0 | 0 | 0 | 0 | 0 | 0 |
| 5 | 0 | 0 | 0 | 0 | 0 | 0 | 0 |
| 4 | 0 | 0 | 0 | 0 | 0 | 0 | 0 |
| 3 | 0 | 0 | 7 | 0 | 0 | 0 | 0 |
| 2 | 7 | 7 | 0 | 0 | 0 | 0 | 0 |
| 1 | 7 | 7 | 0 | 0 | 0 | 0 | 0 |

FIG.34E
PMIN

| | 1 | 2 | 3 | 4 | 5 | 6 | 7 |
|---|---|---|---|---|---|---|---|
| 7 | 0 | 0 | 0 | 0 | 0 | 0 | 0 |
| 6 | 0 | 0 | 0 | 0 | 0 | 0 | 0 |
| 5 | 0 | 0 | 0 | 0 | 0 | 0 | 0 |
| 4 | 0 | 0 | 7 | 7 | 0 | 0 | 0 |
| 3 | 0 | 7 | 7 | 7 | 0 | 0 | 0 |
| 2 | 7 | 7 | 7 | 0 | 0 | 0 | 0 |
| 1 | 7 | 7 | 0 | 0 | 0 | 0 | 0 |

466 — FOR EACH PIXEL, SET $I_{13} = I_9 - I_{11}$

470 — STARTING WITH THE $I_{12}$ VALUES FOR THE PIXELS, PERFORM MAX, MIN, PMIN AND PMAX OPERATIONS TO PRODUCE $I_{14}$ VALUES

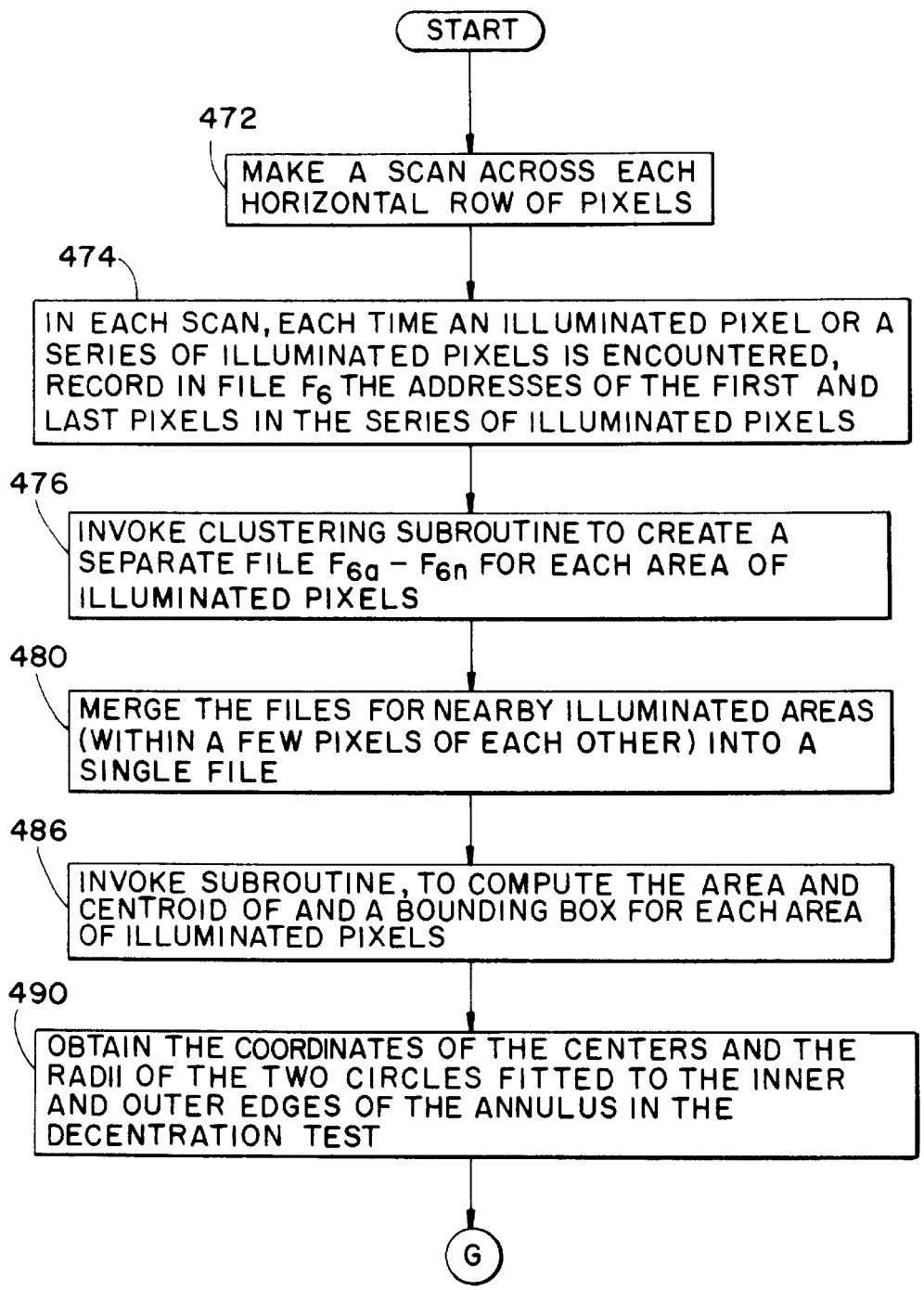

LENS INSPECTION SYSTEM

CROSS-REFERENCE TO RELATED APPLICATIONS

This application is a continuation application of U.S. Ser. No. 08/757,334 filed Nov. 27, 1996, now U.S. Pat. No. 5,805,876, which is a File Wrapper continuation application of U.S. Ser. No. 08/622,022 filed Mar. 27, 1996, now abandoned, which is a File Wrapper continuation application of U.S. Ser. No. 08/506,595 filed Jul. 25, 1995, now abandoned, which is a continuation of U.S. Ser. No. 08/374,407 filed Jan. 17, 1995, now abandoned, which is a File Wrapper continuation application of U.S. Ser. No. 07/994,564 filed Dec. 21, 1992, now abandoned.

BACKGROUND OF THE INVENTION

This application relates to copending application Ser. No. 07/995,281 filed herewith for "A Method and System for Automatically Inspecting Ophthalmic Lenses," now abandoned, to copending application Ser. No. 07/994,565 filed herewith for "Illumination and Imaging Subsystems for a Lens Inspection System," now abandoned, to copending application Ser. No. 07/995,654 filed herewith for "A Method of Inspecting Ophthalmic Lenses," and to copending application Ser. No. 07/995,622 filed herewith for "An Apparatus for Carrying Ophthalmic Lenses" now abandoned.

This invention generally relates to systems for inspecting ophthalmic lenses, and more particularly, to a high speed, automated system for inspecting contact lenses.

Contact lenses are, typically, made with a high degree of precision and accuracy. Nevertheless, on rare occasions, a particular lens may contain some irregularity; and for this reason, contact lenses are inspected before sale to the consumer to be certain that the lenses are acceptable for consumer use.

In one type of prior art lens inspection system, an illuminating beam is transmitted through a lens and then focused on a screen to produce thereon an image of the lens, and an operator looks at that image to determine if the lens contains any irregularities. If any irregularity or flaw is found that makes the lens unsuitable for consumer use, the lens is either removed from the inspection system or otherwise identified so that it is not subsequently sold to a consumer.

This prior art inspection system is very effective and reliable; however, the system is also comparatively slow and expensive. This is primarily because a human operator must focus on the lens image produced on the screen and check that whole image for any irregularities. It is thus believed that the prior art system can be improved upon; and in particular, it is believed that the cost of the lens inspection can be reduced and the speed of the inspection can be increased by providing an automated system to perform these inspections.

SUMMARY OF THE INVENTION

An object of this invention is to improve systems for inspecting ophthalmic lenses.

Another object of the present invention is to provide a high speed, automated system for inspecting contact lenses.

A further object of this invention is to position an ophthalmic lens automatically in a well-defined lens inspection position, to transmit automatically a light pulse through that lens and then to focus selected portions of that light pulse onto a pixel array, and to process automatically signals from that pixel array to determine if the lens contains any irregularities that make the lens unsuitable for consumer use.

These and other objectives are obtained with a lens inspection system comprising a transport subsystem to move a multitude of ophthalmic lenses along a predetermined path to move each of those lenses, one at a time, into a lens inspection position; and an illumination subsystem to generate a series of light pulses and to direct a respective one light pulse through each ophthalmic lens moving through the lens inspection position. The lens inspection system further comprises an imaging subsystem to generate a set of signals representing selected portions of the light pulses transmitted through the ophthalmic lenses; and an image processing subsystem to receive those signals from the imaging subsystem and to process those signals according to a predetermined program to identify at least one condition of each of the lenses.

Preferably, the imaging subsystem generates a respective one set of signals representing selected portions of the light pulse transmitted through each of the ophthalmic lenses, and the image processing subsystem processes each of these sets of signals to determine if the lens is suitable for consumer use. If the lens is found to be unsuitable for consumer use, the image processing subsystem then generates a signal to indicate this finding.

Preferably, the lens inspection system further includes a control subsystem to synchronize the operation of the illumination and imaging subsystems with the operation of the transport subsystem. In particular, the control subsystem is provided to actuate the illumination subsystem to generate a respective one of the light pulses each time one of the ophthalmic lenses moves through the lens inspection position.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 2 is a plan view of one type of ophthalmic lens that may be inspected by the system of FIG. 1.

FIG. 3 is a side view of the lens shown in FIG. 2.

FIG. 3A is an enlarged view of a peripheral portion of the lens shown in FIGS. 2 and 3.

FIGS. 11A, 11B and 11C show three alternate optical configurations that may be used in the illumination and imaging subsystem.

FIG. 17B, are illuminated.

FIGS. 34A–34E generally illustrate the results of various operations referred to as MAX, PMAX, MIN, and PMIN.

FIGS. 41A and 41B show a flow chart of a procedure used to identify any flaws or defects in the lens being inspected.

DETAILED DESCRIPTION OF THE PREFERRED EMBODIMENTS

Figure 1:
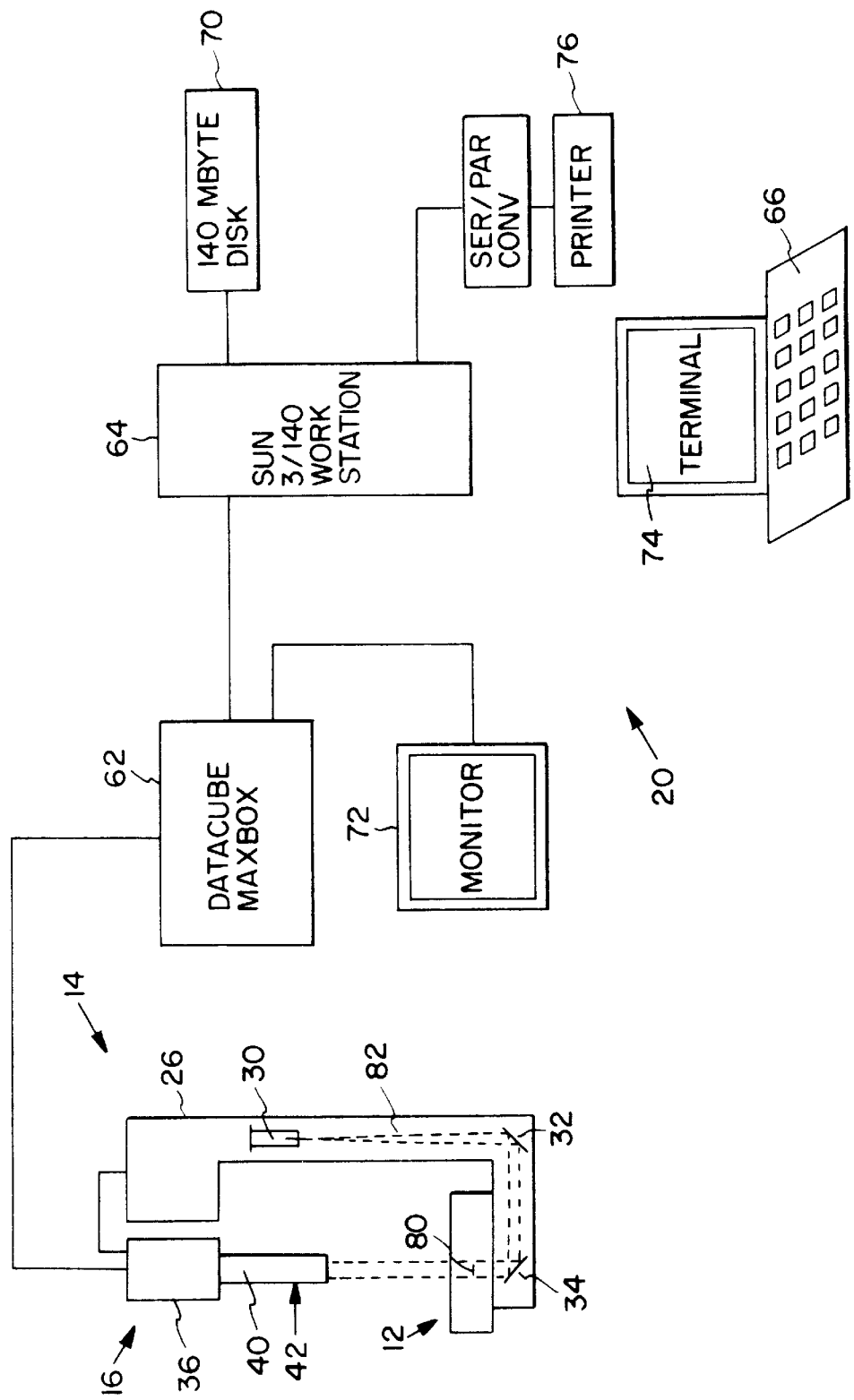
FIG. 1 schematically illustrates a system for automatically inspecting ophthalmic lenses.

FIG. 1 is a block diagram illustrating lens inspection system 10; and generally system 10 comprises transport subsystem 12, illumination system 14, imaging subsystem 16, and image processing subsystem 20. With the preferred embodiment of system 10; transport subsystem 12 includes lens carrier 22 and support assembly 24 (shown in FIG. 4); and illumination subsystem 14 includes housing 26, light source 30, and mirrors 32 and 34. Also, with this preferred system 10, imaging subsystem 16 includes camera 36, stop 40, and lens assembly 42. More specifically, with reference to FIG. 8, the camera includes housing 44, pixel array 46, and shutter 50; and the lens assembly includes housing 52, a pair of lenses 54 and 56, and a plurality of baffles 60. As shown in FIG. 1, image processing subsystem 20 includes preprocessor 62, main processor 64, and input means such as keyboard 66; and preferably subsystem 20 further includes memory unit 70, video monitor 72, keyboard terminal 74, and printer 76.

Generally, transport subsystem 12 is provided to move a multitude of ophthalmic lenses along a predetermined path to move each of those lenses, one at a time, into a lens inspection position, and FIG. 1 shows one such lens 80 in this lens inspection position. Illumination subsystem 14 is provided to generate a series of light pulses and to direct a respective one light pulse onto light path 82 and through each ophthalmic lens moving through the lens inspection position. Subsystem 16 generates a set of signals representing selected portions of the light pulses transmitted through the ophthalmic lens and then transmits these signals to processing subsystem 20. The image processing subsystem receives those signals from subsystem 16 and processes those signals according to a predetermined program to identify at least one condition of each of the lenses that is inspected; and in the preferred embodiment of subsystem 20 described below in detail, that subsystem determines whether each inspected lens is acceptable for consumer use.

System 10 may be used to inspect a large variety of types and sizes of ophthalmic lenses. The system is particularly well-suited for inspecting contact lenses, and FIGS. 2 and 3 illustrate, for example, contact lens 84 that may be inspected by system 10. Lens 84 has a generally hemispherical shape, including front and back surfaces 86 and 90; and the lens forms a central optical zone 84a and an outer zone 84b. The lens has a substantially uniform thickness; however, as particularly shown in FIG. 3A, the thickness of the lens gradually decreases over the annulus 84C immediately adjacent the outside edge of the lens.

Figure 4:
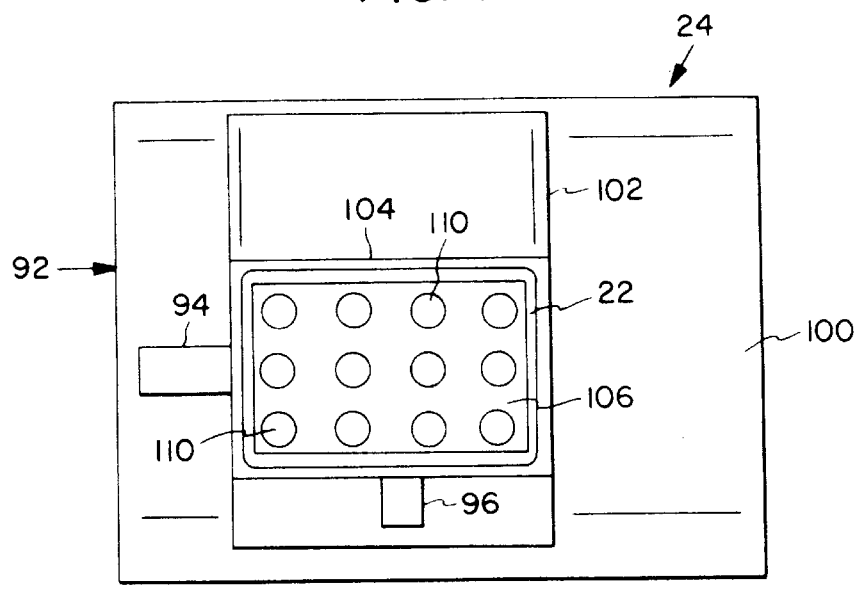
FIG. 4 is a more detailed view of the transport subsystem used in the lens inspection system of FIG. 1.

FIG. 4 illustrates transport subsystem 12 in greater detail; and as discussed above, this subsystem preferably includes lens carrier 22 and support assembly 24. More specifically, this support assembly includes translation table 92 and first and second stepper motors 94 and 96, and the translation table, in turn, includes base member 100 and frames 102 and 104.

Figure 5:
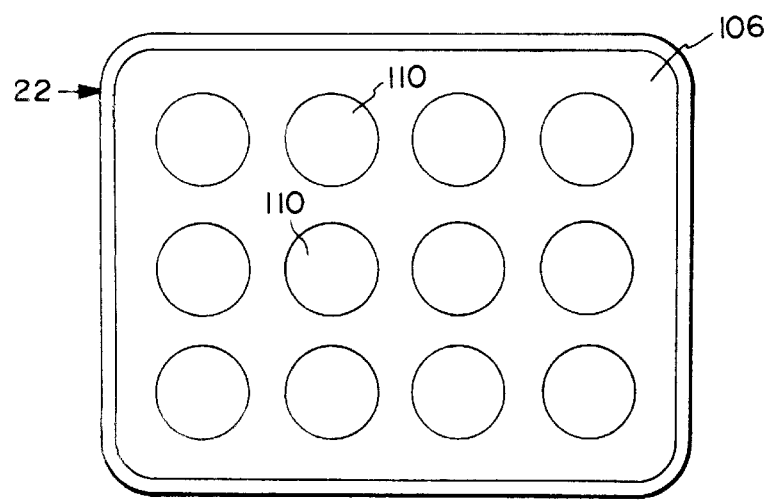
FIG. 5 is a plan view of a lens carrier used in the system of FIG. 1.
Figure 6:
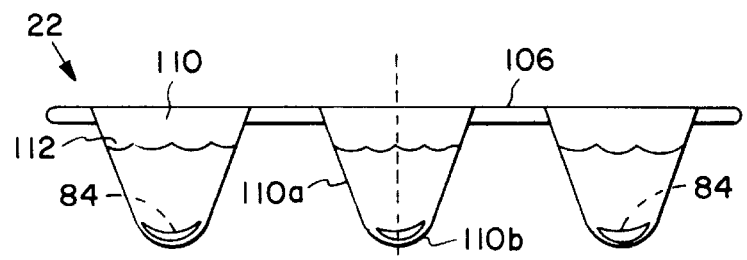
FIG. 6 is a side view of the lens carrier shown in FIG. 1.

Generally, lens carrier 22 is provided to hold a multitude of the ophthalmic lenses, and FIGS. 5 and 6 show the lens carrier in greater detail. As shown therein, the lens carrier includes a rectangular base member 106 and an array of lens inspection cups 110 connected to the base member. Preferably, each cup consists of a frusto-conical sidewall 110a and a hemi-spherically shaped bottom portion 110b integrally connected to and extending downward from the sidewall of the cup. In addition, the bottom portion of each cup preferably has a constant radius of curvature, approximately 10% larger than the radius of curvature of the ophthalmic lens 84 placed in the cup, and the diameter of the bottom portion 110b is greater than the diameter of the ophthalmic lens. Also, the sidewall of each cup extends at a slope of about 20° with respect to the axis of the cup, and the thickness of each sidewall is preferably less than about 0.010 inches.

With the particular lens carrier 22 shown in FIGS. 5 and 6, the diameter of the top of each cup 110 is about 22 mm; and the depth of each cup is preferably greater than the diameter of the lens to be inspected, which, for contact lenses, is typically 20 mm. As shown in FIGS. 5 and 6, the lens carrier includes a 3×4 array of inspection cups. As will be understood by those of ordinary skill in the art, the inspection cups may be arranged in other configurations; and for instance, the cups may be arranged in a 3×3 array, a 3×8 array, a 4×8 array, a 3×10 array, or a 4×10 array.

Cups 110, and preferably base member 106, are made of a substantially transparent material, such as polyvinyl chloride plastic. Moreover, preferably cups 110 and base member 106 are integrally molded together and are relatively thin, which reduces the cost and thus, as a practical matter, allows the carrier to be disposed after a single use. Disposing of the carrier after a single use substantially reduces or eliminates the formation of scratches in the cups, which are often made when lens inspection cups are reused. Since, as discussed below, a scratch on a cup may be interpreted as a flaw or defect in the lens inside the cup, the use of readily disposable lens carriers improves the accuracy of the lens inspection process.

In use, each cup 110 is partially filled with a fluid solution 112 such as, for example, a saline solution, and a respective one ophthalmic lens is placed at the bottom of each cup, fully submerged in the solution therein. When a lens is placed in a cup, the cup tends to center the lens automatically therein at the bottom of the cup, due to the above-described shape and parameters of the cup.

With reference again to FIG. 4, support assembly 24 is provided to support the lens carrier and to move the lens carrier so as to move each of the lenses therein, one at a time, into the lens inspection position. Preferably, support assembly 24 moves lens carrier 22 continuously along a predetermined path to move lenses 84 smoothly into and through that lens inspection position. For instance, the support assembly may be designed to move the lens carrier so that cups 110 of that carrier are moved through the lens inspection position, one row of cups at a time; and after each row of cups is passed through the lens inspection position, support assembly 24 moves carrier 22 to align another row of cups with the lens inspection position.

With the preferred support assembly 24 shown in FIG. 4, frame 102 of translation table 92 is supported by base 100 for lateral movement thereon, to the right and to the left as viewed in FIG. 4; frame 104 is supported by frame 102 for movement thereon, upward and downward as viewed in FIG. 4; and lens carrier 22 is supported on frame 104 for movement therewith. Stepper motor 94 is mounted on base 100 and connected to frame 102 to move that frame across the base member, and stepper motor 96 is mounted on frame 102 and connected to frame 104 to move this latter frame.

Any suitable frames 102 and 104 and stepper motors 94 and 96 may be used in support assembly 24. Moreover, as will be understood by those of ordinary skill in the art, other suitable support assemblies are known and may be used to move lens carrier 24 in the desired manner.

With reference again to FIG. 1, subsystems 14 and 16, together, produce and then utilize an effect referred to as dark field illumination to inspect the ophthalmic lenses moving through the lens inspection position. In this procedure, an image is formed on pixel array 46 of features of the ophthalmic lens that scatter or reflect light transmitted through the lens. Dark field illumination may be used—and indeed is a highly effective procedure—to detect flaws or irregularities in ophthalmic lenses because essentially all defects, as well as some normal features, of the ophthalmic lenses scatter light; and even very subtle, shallow defects, such as those referred to as puddles, can be readily detected by using a dark field illumination procedure.

Figure 7:
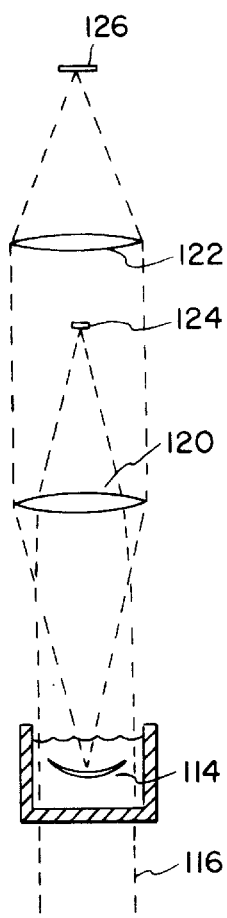
FIG. 7 is a schematic diagram generally illustrating the principles of an illumination technique referred to as dark field illumination.

The principle of dark field illumination may be understood with reference to FIG. 7, which shows an ophthalmic lens 114, a collimated light beam 116, a pair of lenses 120 and 122, an opaque stop 124, and a pixel array 126. Light beam 116 is transmitted through ophthalmic lens 114 and then is incident on imaging lens 120. If the illumination beam 116 were perfectly collimated when incident on lens 114, then that beam would be brought to a focus at the back focal point of lens 120. Even if the illuminating beam 116 is completely unaffected by ophthalmic lens 114, though, that beam is not perfectly collimated when incident on lens 120, and the beam 116 forms a small circle, referred to as a circle of least confusion, at approximately the back focal point of lens 120. Stop 124 is located on the other side of imaging lens 120, at this back focal point thereof, and the size of the stop is selected to be slightly larger than that circle image formed by the illuminating beam 116 at the back focal point of lens 120.

Thus, in the absence of any scattering or refraction of illumination beam 116 by lens 114, no light is transmitted past stop 124, and pixel array 126 is completely dark. However, any feature of lens 114 that deflects light enough to miss the stop 124, will cause some light to be incident on the pixel array. The ophthalmic lens 114 is located at a position that is optically conjugate to the position of the pixel array 126; and thus, if any light is transmitted past stop 124, that light forms an image on the pixel array of the entity of ophthalmic lens 114 that scattered the light.

Figure 8:
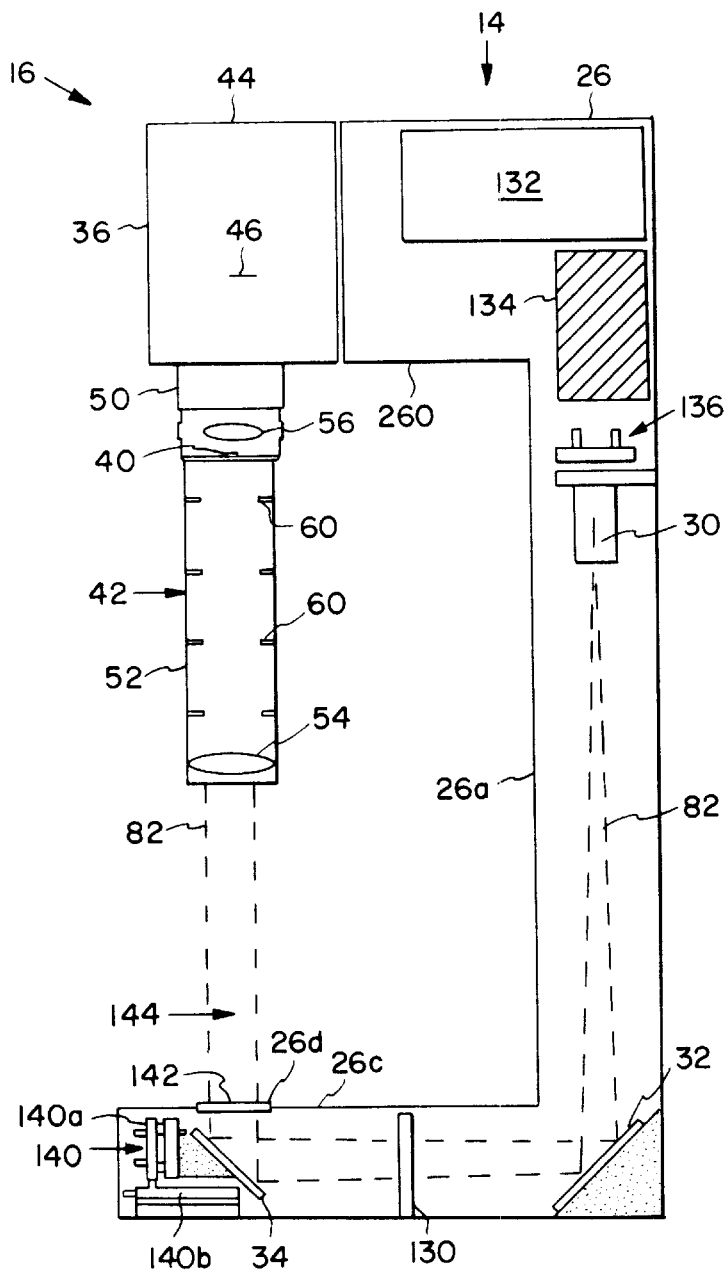
FIG. 8 is a more detailed diagram of the illumination and imaging subsystems of the lens inspection system shown in FIG. 1.

FIG. 8 shows the preferred apparatus for producing and then utilizing this dark field illumination effect in system 10;

and in particular, this figure shows the preferred illumination subsystem and imaging subsystem in greater detail. As shown in this figure, subsystem 14 includes housing or casing 26, light source 30, mirrors 32 and 34, diaphragm 130, power supply 132, control circuit 134, first and second adjustable support means 136 and 140, and exit window 142. Also, subsystem 16 includes camera 36, stop 40, and lens assembly 42. More specifically, camera 36 includes housing 44, pixel array 46, and shutter 50; and lens assembly 42 includes housing 52, lenses 54 and 56, and baffles 60.

Housing 26 of subsystem 14 provides a protective enclosure for other elements of this subsystem; and light source 30, mirrors 32 and 34, and diaphragm 130 are all secured in that housing. More specifically, housing 26 includes a main vertical leg 26a and top and bottom horizontal legs 26b and 26c, and light source 30 is positioned inside the main leg of the housing. Mirror 32 is secured in the intersection of legs 26a and 26c, mirror 34 is positioned adjacent the distal end of leg 26c, and diaphragm 130 is positioned inside leg 26c, between mirrors 32 and 34. Housing 26 also forms an opening 26d directly above mirror 34, and window 142 is secured in that opening. In use, light source 30 generates a multitude of light flashes or pulses and directs each of those pulses onto light path 82. Mirror 32 is located on this path and directs the light pulses through diaphragm 130 and onto mirror 34, which in turn directs the light pulses upwards, through window 142, through the lens inspection position, referenced at 144 in FIG. 8, and toward or onto imaging subsystem 16.

Preferably, light source 30 is mounted on adjustable support means 136 that allows the specific direction of the light emitted from that light source to be adjusted, and mirror 34 is mounted on another adjustable support means 140 that allows both the specific direction and the specific position of the light reflected from that mirror to be adjusted. More particularly, with the preferred embodiment of subsystem 14 shown in FIG. 8, support means 136 includes a tilt stage that is secured to housing 26 and is pivotal about two mutually orthogonal horizontal axes. Also, with this embodiment of subsystem 14, mirror support means 140 includes tilt stage 140a and translation stage 140b; and mirror 34 is mounted on the former stage, which in turn is mounted on the latter stage. Stage 140b is movable laterally, to the left and to the right as viewed in FIG. 8, allowing the lateral position of mirror 34 to be adjusted; and stage 140a is pivotal about two mutually perpendicular horizontal axes, also allowing the specific angle of mirror 34 to be adjusted.

Imaging subsystem 16 receives light pulses transmitted through the ophthalmic lenses located in the lens inspection position 144, and generates a series of signals representing selected portions of the light transmitted through those ophthalmic lenses. More particularly, pixel array 46 is disposed inside camera housing 44, directly behind shutter 50; and the pixel array is preferably comprised of a multitude of light sensors each of which is capable of generating a respective one electric current having a magnitude proportional to or representing the intensity of light incident on that sensor.

Figure 9:
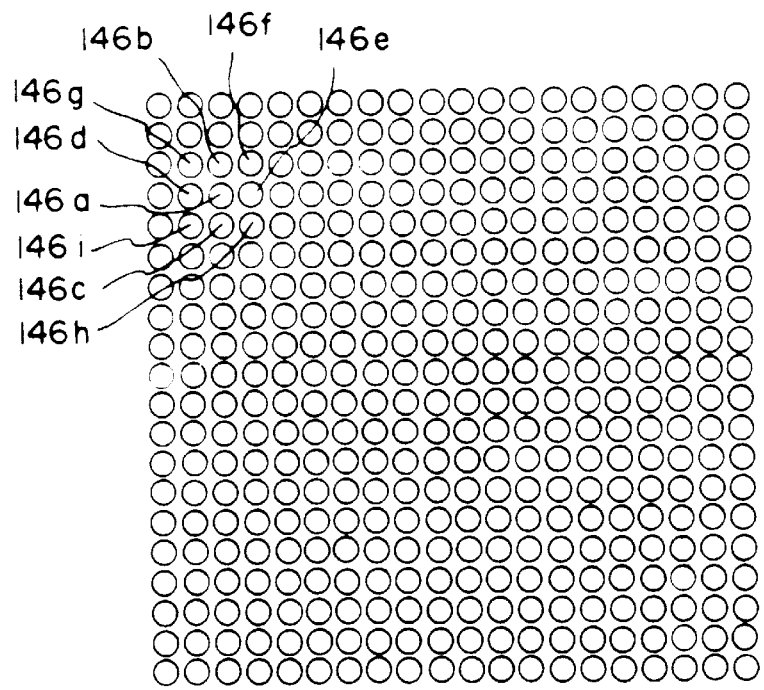
FIG. 9 shows a portion of a pixel array of the imaging subsystem.

FIG. 9 is an enlarged view of a small portion of pixel array 46, and in particular, shows a multitude of individual light sensors of the pixel array. With reference to this Figure, preferably these light sensors, or pixels, are arranged in a uniform grid of a given number of rows and columns, and for example, that grid may consist of one million pixels arranged in one thousand columns and one thousand rows. Preferably, in that grid, the pixels form a multitude of uniformly spaced rows and a multitude of uniformly spaced columns; and, except for those pixels along the very edge of the array, each pixel has eight immediate neighbors. For example, pixel 146a has eight neighbors: pixel 146b located directly above, pixel 146c located directly below, pixels 146d and 146e located directly to the left and to the right respectively, and pixels 146f, 146g, 146h, and 146i located, respectively, above and to the right, above and to the left, below and to the right, and below and to the left.

With reference again to FIG. 8, stop 40 and lenses 54 and 56 are located forward of shutter 50 and are coaxially aligned with each other and with pixel array 46 and the camera shutter. Stop 40 is positioned between lenses 54 and 56 and substantially at the back focal plane of lens 54, and lens 56 is positioned so that the pixel array is at the back focal plane of this lens 56. Preferably, lenses 54 and 56 and stop 40 are mounted inside housing 52, which in turn is mounted on the front end of camera 36. In addition, baffles 60, which may comprise a series of ring-shaped members, are preferably mounted in and spaced along the length of housing 52 to help collimate the light travelling therethrough.

With this specific position of lenses 54 and 56 and stop 40, most or all of the light beam transmitted through a particular ophthalmic lens being inspected is focused by lens 54 onto stop 40, and is thus not incident on pixel array 46. However, some of the light passing through irregular features of the ophthalmic lenses, as well as some of the light passing through regular features of some ophthalmic lenses, may be deflected sufficiently so that this light is not focused onto stop 40 by lens 54, but instead is transmitted past that stop and is incident on the pixel array 46. In addition, the lens inspection position is located at a position that is optically conjugate to the position of pixel array 46, and thus any light that is transmitted past stop 40 forms an image on the pixel array of the entity of the ophthalmic lens that scattered that light.

Figure 10:
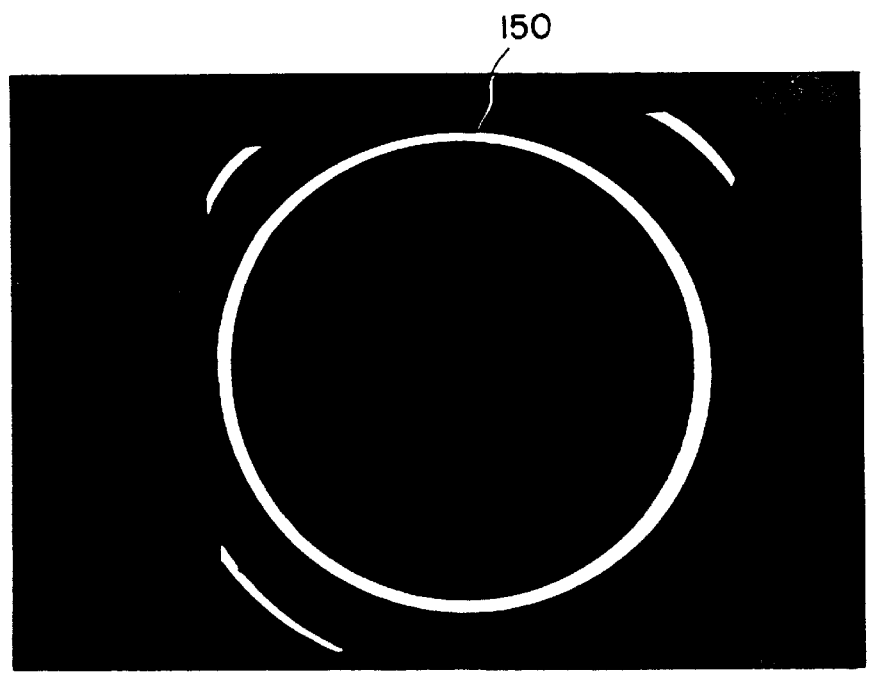
FIG. 10 shows an image that is formed on the pixel array when an ophthalmic lens of the type shown in FIGS. 2 and 3, is being inspected in the lens inspection system of FIG. 1.

This dark field illumination technique is a very effective way to illuminate irregularities in ophthalmic lenses; and FIG. 10 shows the image formed on pixel array 46 by a beam of light transmitted through an ophthalmic lens, and in particular, through a contact lens 84 shown in FIGS. 2 and 3. Most of the light transmitted through the lens is blocked from the pixel array by step 40. However, due to the non-uniform thickness of annulus 84c of the lens, the light transmitted through this portion of the lens is deflected past stop 40 and is incident on pixel array 46, forming a picture of the annulus on that array. Other irregularities in lens 84 also produce illuminated areas on the pixel array. For instance, even subtle, shallow defects, such as puddles can be seen on the pixel array. In particular, if a puddle is present in the interior of the lens, then the puddle will readily appear on the pixel array as a bright outline on a dark field; and if a puddle is present in the peripheral zone of a lens, then the puddle will readily appear on the pixel array as dark lines on a bright field. Also, since the peripheral zone of the contact lens has a wedge-shaped cross-section, that peripheral zone deflects enough light past stop 40 to cause the entire zone to appear on pixel array 46 as a bright white annulus 150 on a dark field.

As will be understood by those of ordinary skill in the art, any suitable light source, lenses, and camera may be used in subsystems 14 and 16. For instance, the light source 30 may be a short-arc xenon flash lamp made by Hamamatsu. This particular flash lamp has a unique combination of arc stability and longevity, and the output of this flash lamp is rated plus or minus 2%, with a lifetime of $10^9$ flashes.

Further, with an embodiment of subsystem 16 that has been actually reduced to practice, first imaging lens 54 is a 100 mm focal length achromatic lens that is diffraction-limited for objects within 2.5° of the optical axis of the lens, and the lens 54 is mounted in a black-anodized aluminum tube, with internal baffles 60 to eliminate degradation of contrast due to the reflection of light from the inside walls of the tube. The second lens 56 is a standard 50 mm focal length F-1.8 Nikon lens. The end of the barrel for the first lens 54 is cemented onto an ultraviolet haze filter, which is threaded into the housing of the 50 mm lens.

Opaque stop 40 is a small plastic circle with a diameter of 0.100 inches, and includes an adhesive backing to secure the stop in place. Suitable stops are commercially available and are used as solder pad masks in manual layout of art work for printed circuit boards, and these stops are available in a large variety of sizes. The preferred size of stop 40 may vary depending on other parameters of system 10, and the selected size of the stop is preferably chosen to provide the best compromise between contrast, ease of alignment, and sensitivity to vibration.

The camera used in the subsystem 16 that has been actually constructed, is a high-resolution camera sold by Videk, and that accepts a standard Nikon mount lens. The F-1.8 50 mm Nikon lens 56 is first mounted on camera 36, and then the housing of lens 54 is threaded onto the lens 56. The effective field of view of this Videk camera is 13.8×13.8 mm, which is, for example, about 10–15% larger than the maximum contact lens size. It is desirable that the ophthalmic lens being inspected occupy as much of the field of view of camera 36 as possible in order to optimize the accuracy of the inspection. Hence, by automatically centering the lens to be inspected, the inspection cups 110 of lens carrier 22 make maximum use of the resolution available in the camera.

The preferred configurations of subsystems 14 and 16 have a number of advantages. First, because light path 82 is folded, the flash lamp 30 may be placed a larger distance from the ophthalmic lens that is at the lens inspection position 144, and this produces a highly collimated beam of light at that ophthalmic lens. Second, the size of the image of the arc on the stop 40 is substantially equal to the physical size of the arc, multiplied by the ratio of (i) the distance from lamp 30 to lens 54 to (ii) the distance from lens 54 to stop 40. The preferred configuration shown in FIG. 8 also minimizes the arc image size, allowing the use of a smaller stop and consequently producing greater sensitivity. Third, iris diaphragm 130 limits the cross-sectional area of light beam 82 and thus the area that is illuminated by that beam. Preferably, diaphragm 130 is used to adjust the cross-sectional area or size of beam 82 so that the beam illuminates a circular area about only 10 to 15% larger than the diameter of the ophthalmic lens being inspected. Limiting the size of the illumination beam 82 improves the contrast between the image produced on the pixel array and the rest of that array; and in particular, limiting the size of beam 82 eliminates or substantially reduces the amount of light that scatters from artifacts of the lens inspection cup. This scattered light might appear as background light on pixel array 46, reducing the contrast between the image of interest on the pixel array and the rest of that array.

In addition, with the preferred configuration of subsystems 14 and 16, the magnification factor of the system—that is, the ratio of the size of the image of the ophthalmic lens on the pixel array 46 to the actual size of that ophthalmic lens—is approximately equal to the ratio of the focal length of the second lens 56 to the focal length of the first lens 54. The actual magnification factor also depends upon the distance between the lenses 54 and 56 and the distance of the ophthalmic lens being inspected from the first imaging lens 54. In addition, tilt stage 140a and translation stage 140b allow the center of the output beam reflected off of mirror 34 to be adjusted to coincide with the axis of the imaging optical subsystem 16.

As described above, imaging subsystem 16 includes two lenses 54 and 56, separated by approximately the focal length of the first lens 54. The use of two lenses is not necessary; however, this is preferred because the use of two lenses provides for a greater control over various parameters of subsystems 14 and 16, and for example, it decouples the separation between the back focal plane and the image plane from the magnification of the subsystems.

FIGS. 11A, 11B, and 11C illustrate alternate optical configurations, generally referenced at 152, 154, and 156 respectively, that may be employed in system 10 for directing light beam 82 through the lens inspection position and the ophthalmic lens held in that position, and onto stop 40 and pixel array 46.

Configuration 152 includes only one lens 160, which simultaneously images light beam 82 onto stop 40 and images the lens being inspected onto pixel array 46. More specifically, the optical configuration shown in FIG. 11A includes mirror 162, imaging lens 160 and stop 40; and the Figure also shows a lens holder, schematically represented at 164, an ophthalmic lens 166 to be inspected and pixel array 46. With this configuration, light beam 82 or pulses from light source 30 is directed to mirror 162, which in turn directs the light through lens 166 and onto imaging lens 160. Most of the light directed to lens 160 is focused thereby onto stop 40; however certain features of lens 166 will deflect light sufficiently so that this deflected light is transmitted past stop 40 and is focused on pixel array 46, producing thereon an image of the features of lens 166 that caused the light to be transmitted past stop 40. The configuration of FIG. 11A may be the preferred configuration if the CCD screen of camera,36 is larger than the CCD screen of the above-mentioned high-resolution Vidik camera.

With configuration 154 of FIG. 11B, the functions of imaging the light source onto stop 40 and imaging the ophthalmic lens being inspected onto pixel array 46 are separated. To elaborate, this configuration includes mirror 170, lenses 172 and 174 and stop 40; and FIG. 11B also shows lens holder 164, ophthalmic lens 166 and pixel array 46. In this configuration, light beam 82 from light source 30 is directed onto mirror 170, and this mirror directs the light beam to lens 172. Lens 172 directs the light through ophthalmic lens 166, and most of the light transmitted through lens 166 is focused on stop 40. Some features of lens 166 deflect light away from stop 40, however; and this deflected light is incident on lens 174, which focuses that light onto pixel array 46, producing thereon an image of the feature of lens 174 that deflected the light past stop 40. An advantage of the lens arrangement of FIG. 11B is that the actions of the two lenses 172 and 174 are completely independent.

Optical configuration 156 shown in FIG. 11C is very similar to the optical configuration shown in FIG. 8; however configuration 156 does not include mirror 32 or diaphragm 130. More particularly, configuration 156 includes mirror 176, lenses 180 and 182 and stop 40; and FIG. 11C also shows lens holder 164, ophthalmic lens 166 and pixel array 46. With the arrangement of FIG. 11C, light beam 82 from light source 30 is directed onto mirror 176, which directs the light through lens 166 and onto first first lens 180. Most of the light directed to lens 180 is focused onto stop 40; however some features of lens 166 deflects light sufficiently so that this light is transmitted past stop 40 and onto second lens 182, and this lens 182 focuses this light onto pixel array 46. In this configuration, lens 180 images the light source onto stop independent of lens 182. Both lenses 180 and 182, however, are involved in imaging any defects in lens 166 onto pixel array 46.

Figure 12A:
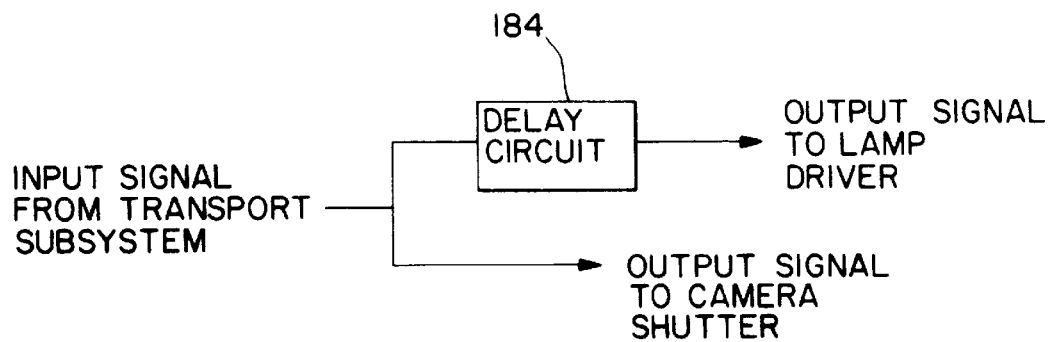
FIG. 12A illustrates the operation of a control subsystem of the lens inspection system.

In addition to the foregoing, system 10 also preferably includes a control subsystem to synchronize the operation of illumination subsystem 14 and imaging subsystem 16 with the operation of transport subsystem 12; and, in particular, to actuate the light source 30 to generate a light pulse, and to open camera shutter 50, when a lens is in the lens inspection position 144. The preferred control subsystem is illustrated schematically in FIG. 12A. With this preferred control subsystem, transport subsystem 12 generates an electric signal each time one of the lens inspection cups is in the lens inspection position. This signal may be generated, for example, by stepper motor 94, or by another drive means for translation table 92, or by a limit switch that is engaged each time one of the lens inspection cups reaches the lens inspection position. Preferably, this signal is transmitted to camera shutter 50 to open that shutter, and also transmitted to a delay circuit 184 that delays the electric signal for a short period, to allow the camera shutter to open completely, and after this short delay, this electric signal is then transmitted to a lamp driver 134 that then actuates light source 30.

Figure 12B:
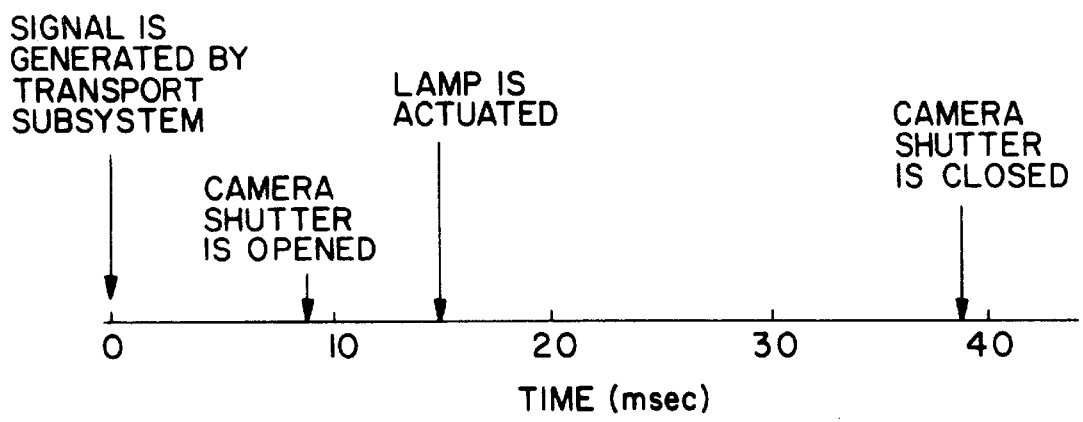
FIG. 12B is a time diagram illustrating the sequence of various events in the operation of the transport, illumination, and imaging subsystems.

For example, with an embodiment of system 10 that has been constructed, and with reference to FIG. 12B, when an ophthalmic lens is in the lens inspection position, the transport subsystem generates and transmits a 24 volt pulse both to camera 36 and to delay circuit 184. The camera shutter opens in response to the leading edge of this pulse, and takes about 9 milliseconds to open completely. The delay circuit delays passage of the signal to lamp driver 134 for about 15 milliseconds; and after this delay, this trigger pulse is transmitted to the lamp driver. The leading edge of this trigger pulse actuates an SCR, which ignites the flash lamp 30. At this point of ignition, the lamp becomes electrically conductive, and a previously charged capacitor is discharged across the lamp. The capacitance and voltage to which that capacitor were charged determine the total light energy emitted by the lamp and the duration of the light pulse. Meanwhile, an interface circuit holds the camera shutter open for about 30 milliseconds and then closes the shutter.

The use of a camera shutter in the above-described manner avoids or substantially reduces the integration of ambient light in pixel array 46 between lens inspections. Also, preferably, the high voltage power supply, lamp driver electronics and storage capacitor are mounted in the housing structure 26 that contains the illumination optics.

The light from lamp 30 is sufficient to allow the capture of an image on pixel array 46 in such a short period of time that it is not necessary to stop the ophthalmic lens being inspected. Thus, the transport subsystem 12 is preferably designed to move an array of ophthalmic lenses continuously under the imaging subsystem 16. This continuous, smooth movement of the ophthalmic lens array is advantageous because it reduces or eliminates the development of ripples or other disturbances of the top of the solution 112 in cups 110, which might interfere with the imaging process.

As will be understood by those of ordinary skill in the art, the desired synchronization or coordination between transport subsystem 12, illumination subsystem 14, and imaging subsystem 16 may be achieved in other ways. For instance, light source 30 may be activated and shutter 50 may be opened at predetermined time intervals that are chosen to coincide with the positioning of a lens in the lens inspection position 144.

The illumination, imaging, and transport subsystems may be enclosed within a housing (not shown) to minimize the effects of airborne debris on the illumination and imaging processes. That housing may be provided with transparent front doors or with front doors having transparent windows to provide access to and to allow observation of the interior of the housing, and the transparent portions of those front doors may be tinted to minimize the effects of ambient room light on the illumination and imaging processes.

Figure 13:
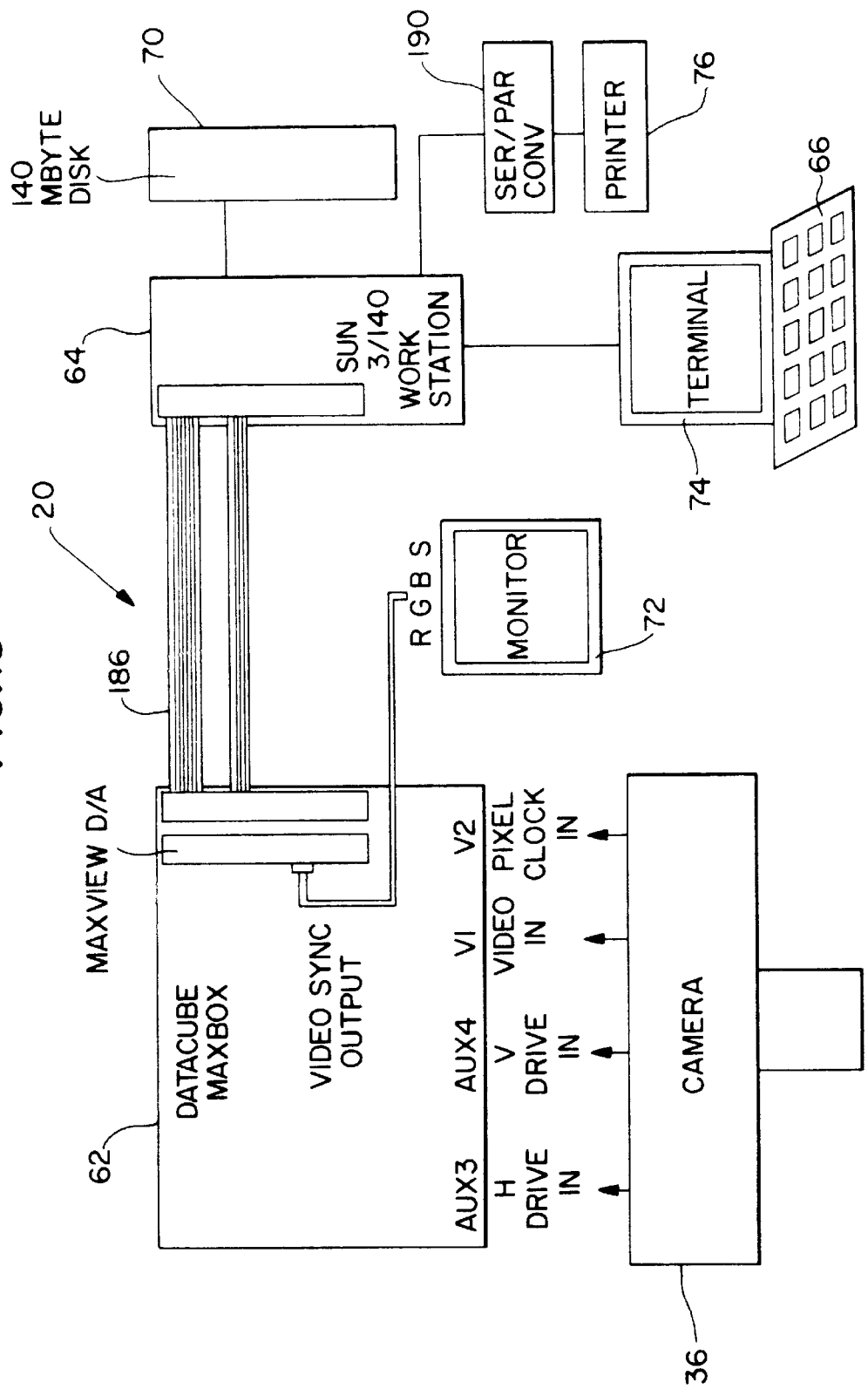
FIG. 13 schematically illustrates the data processing subsystem of the lens inspection system.

FIG. 13 is a block diagram illustrating image processing subsystem 20. In this subsystem, the electric signals from the pixel array are conducted, in a combination of a series and parallel formats, to pre-processor 62. These electric signals being transmitted to pre-processor 62 may be identified in any suitable way with the specific pixels that generated the signals. For instance, the signals from the pixels of camera 36 may be transmitted to pre-processor 62 in a given, timed sequence, and a clock signal may also be transmitted to the preprocessor from the camera to identify the start, or selected intervals, of that sequence. Alternately, each signal transmitted to processor 62 may be provided with a header or another data tag identifying the particular pixel that generated the signal.

Unit 62 converts each electric current signal from each pixel of array 46 into a respective one digital data value, $I_0$, and stores that data value at a memory location having an address associated with the address of the pixel that generated the electric signal. These data values are available to processor 64 and may be transmitted thereto via bus lines 186. Preferably, as discussed in detail below, a plurality of additional sets of data values $I_1 \ldots I_n$ are generated, with each data set having a respective one data value associated with each pixel of array 46, and pre-processor 62 may include a multitude of memory sections, or boards, each one of which is used to store a respective one set of these data values.

Processor 64 is connected to preprocessor 62 via bus lines 186 to obtain data values from and to transmit data values to that preprocessor. As explained in greater detail below, processor 64 is programmed to process and analyze the data values stored in the preprocessor to identify at least one condition or parameter of each lens inspected by system 10, and for example, to indicate whether each lens is acceptable for consumer use.

Memory disk 70 is connected to processor 64 to receive and to hold data values on a permanent or semi-permanent basis. For instance, memory disk 70 may be provided with various look-up tables used by processor 64, and the memory disk may be used to store data relating to or obtained in the lens inspection process. For example, memory disk 70 may be used to keep track of the total number of lenses inspected during a given day or time period, and to keep track of the total number, type, and size of any defects found in any given sample or group of lenses.

Keyboard 66 is connected to processor 64 to allow operator input thereto, and keyboard terminal 74 is used to display visually data or messages being input into the processor. Monitor 72 is connected to preprocessor 62 and is provided to produce video images from the data values stored in the preprocessor. For example, the $I_0$ data values may be transmitted to monitor 72 to produce thereon an image of the real image produced on pixel array 46. Others of the sets of data values $I_1 \ldots I_n$ may be transmitted to monitor 72 to produce refined or processed images of that real image. Printer 76 is connected to processor 64, via serial-parallel converter 190, to provide a visual, permanent record of selected data values transmitted to the printer from processor 64. As will be understood by those of ordinary skill in the art, subsystem 20 may be provided with other or additional input and output devices to allow an operator or analyst to interact with processor 64, preprocessor 62, and memory unit 70.

The individual components of subsystem 20 are conventional and well-known by those of ordinary skill in the art. Preferably, processor 64 is a high-speed digital computer, and monitor 72 is a high resolution color monitor. Also, for example, preprocessor 62 may be an assembly of Datacube signal processing boards, and processor 64 may be a Sun 3/140 work station.

As discussed above, each time an ophthalmic lens passes directly beneath camera 36, light is transmitted through the ophthalmic lens and focused on pixel array 46, and each pixel of array 46 generates a respective one electric output current having a magnitude representing the intensity of the light incident on that pixel. This output current for each pixel is converted to a digital data value that is stored in an address in preprocessor memory associated with the pixel. These digital data values, referred to as the $I_0$ values, are processed, as described below, to determine whether the lens passing beneath the camera 36 includes one or more of a selected group of features; and in particular, to determine whether that lens contains any feature that may be considered as a flaw or defect that renders the lens unsuitable for consumer use.

Figure 14:
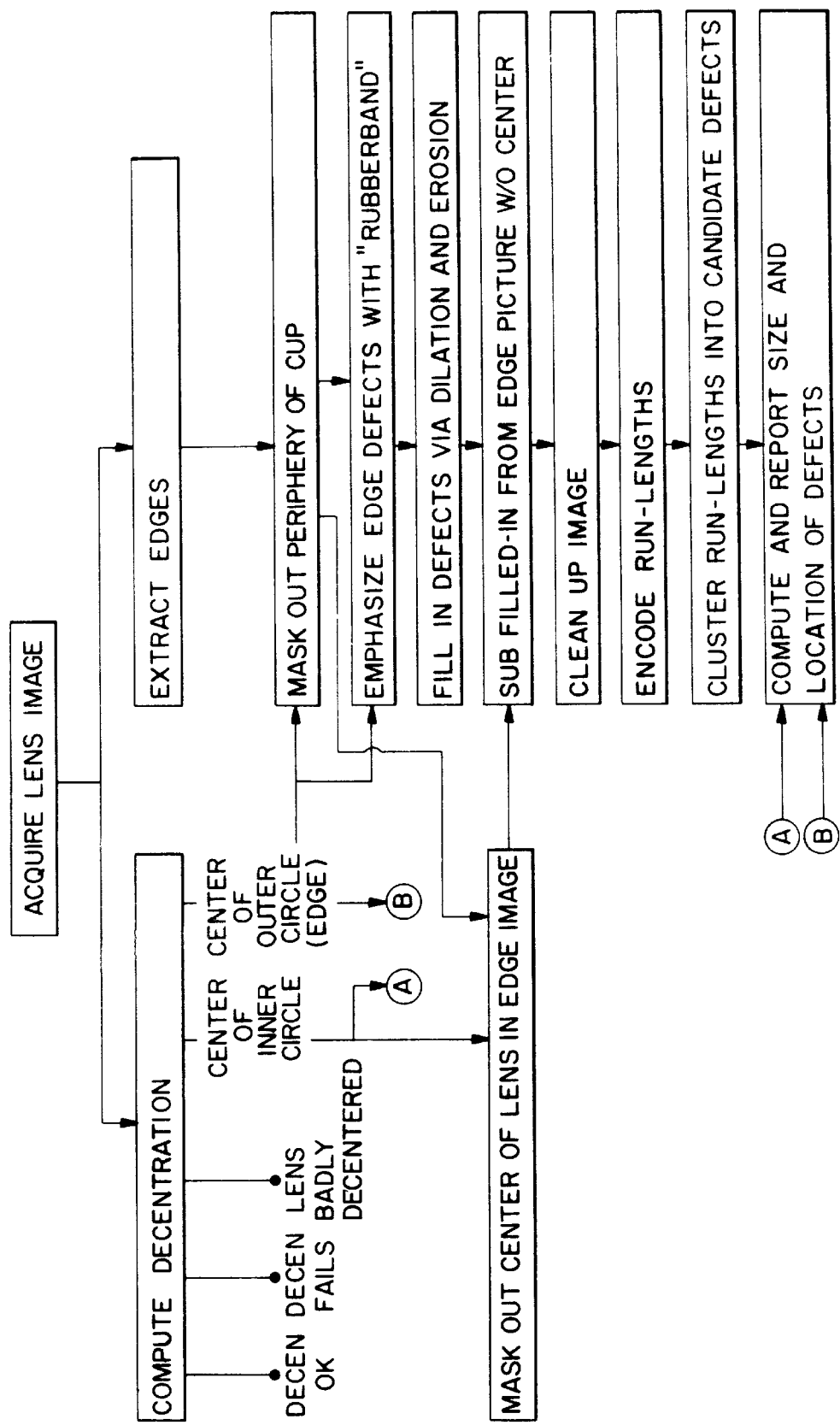
FIG. 14 generally illustrates the major components of a preferred data processing procedure employed with the lens inspection system.

FIG. 14 shows the major components of a preferred image processing procedure to identify any defects in the type of lens 84 shown in FIGS. 2 and 3. After the lens image is acquired on the pixel array, that image is tested, in a procedure referred to as decentration, to determine if the inside and outside circumferential edges of annulus 84c of the lens are properly centered relative to each other, and this decentration test involves fitting first and second circles to the inner and outer edges of the annulus produced on the pixel array. After this, the actual edges of the annulus are found or extracted. Then, a first masking procedure is used to reduce or eliminate data associated with light refracted or deflected by the periphery of the lens inspection cup, and any edge defects are highlighted by a procedure referred to as the rubber band algorithm. Next, any defects are further emphasized by procedures referred to as fill-in and clean-up and by a second mask procedure that eliminates data associated with certain pixels near the center of the annulus image.

After any possible defects are emphasized or highlighted, a search is made to determine if in fact any defects exist. In particular, the pixels of array 46 are searched—or, more precisely, data values associated with those pixels are searched—to identify line segments, or runlengths, of pixels that may be part of a defect, and those runlengths are then clustered to identify defect candidates. Then, the sizes and locations of these defect candidates are analyzed to determine if they are actual defects that make the lens unsuitable for consumer use.

Figure 15:
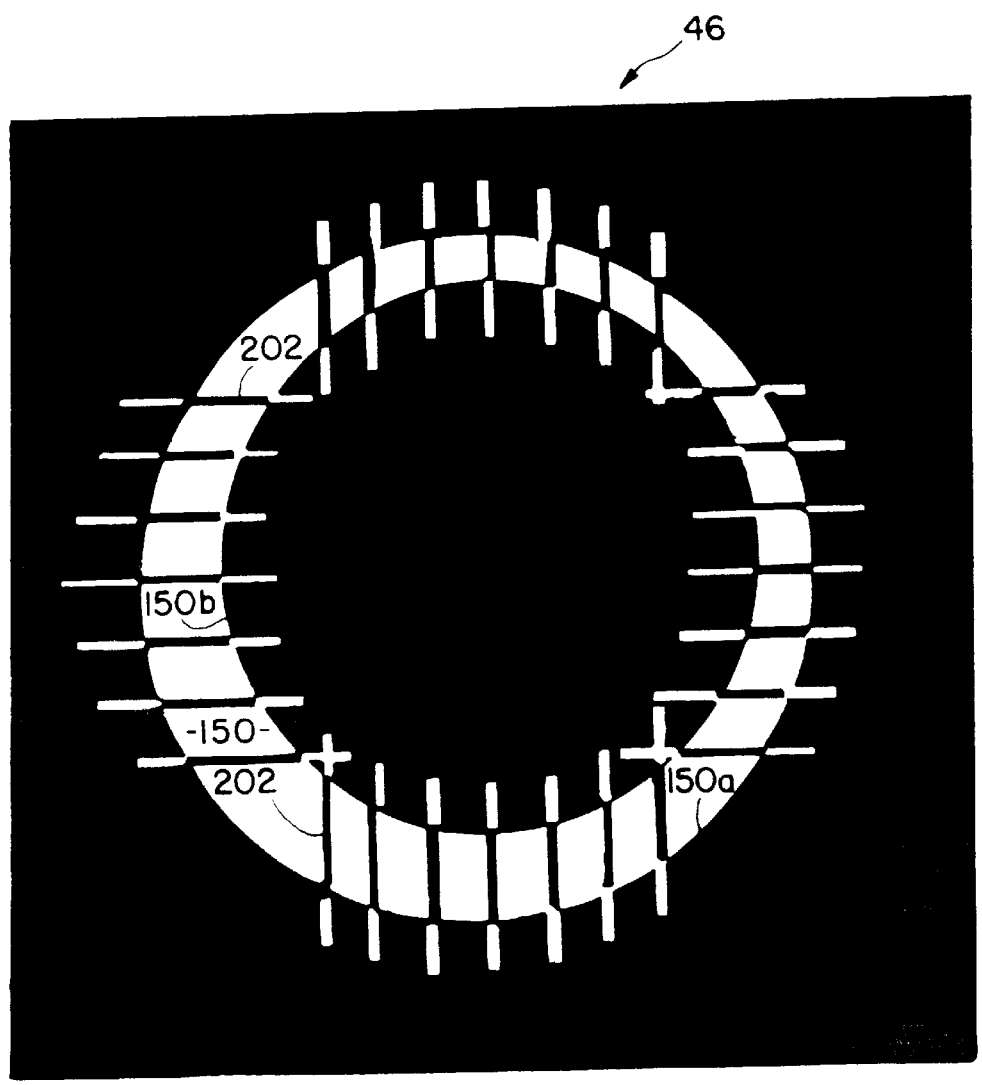
FIG. 15 shows an image of an ophthalmic lens formed on the pixel array of the lens inspection system.

As mentioned above, the decentration test is used to determine whether the inside and outside circumferential edges of annulus 84c of the lens passing beneath the camera are concentric. Generally, with reference to FIG. 15, this is done by making a multitude of scans 202 across the pixel array 46—or, more precisely, by studying data values at addresses in the preprocessor memory that correspond to the addresses of pixels in selected line segment on array 46—to determine whether the outside and inside edges 150a and 150b of annulus 150 are concentric.

Figure 16A:
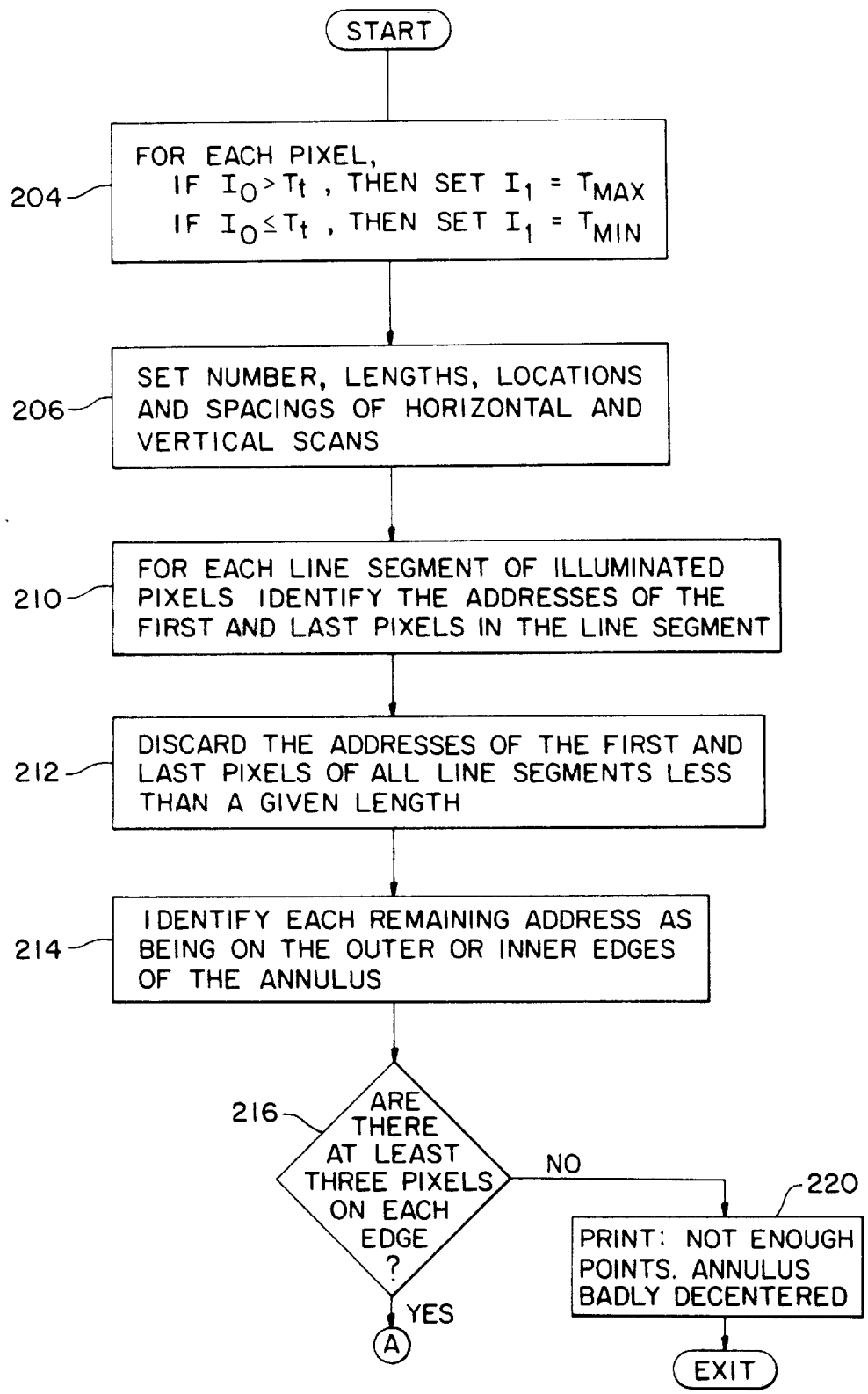
FIGS. 16A and 16B are flow charts illustrating a lens inspection procedure referred to as a decentration test.
Figure 16B:
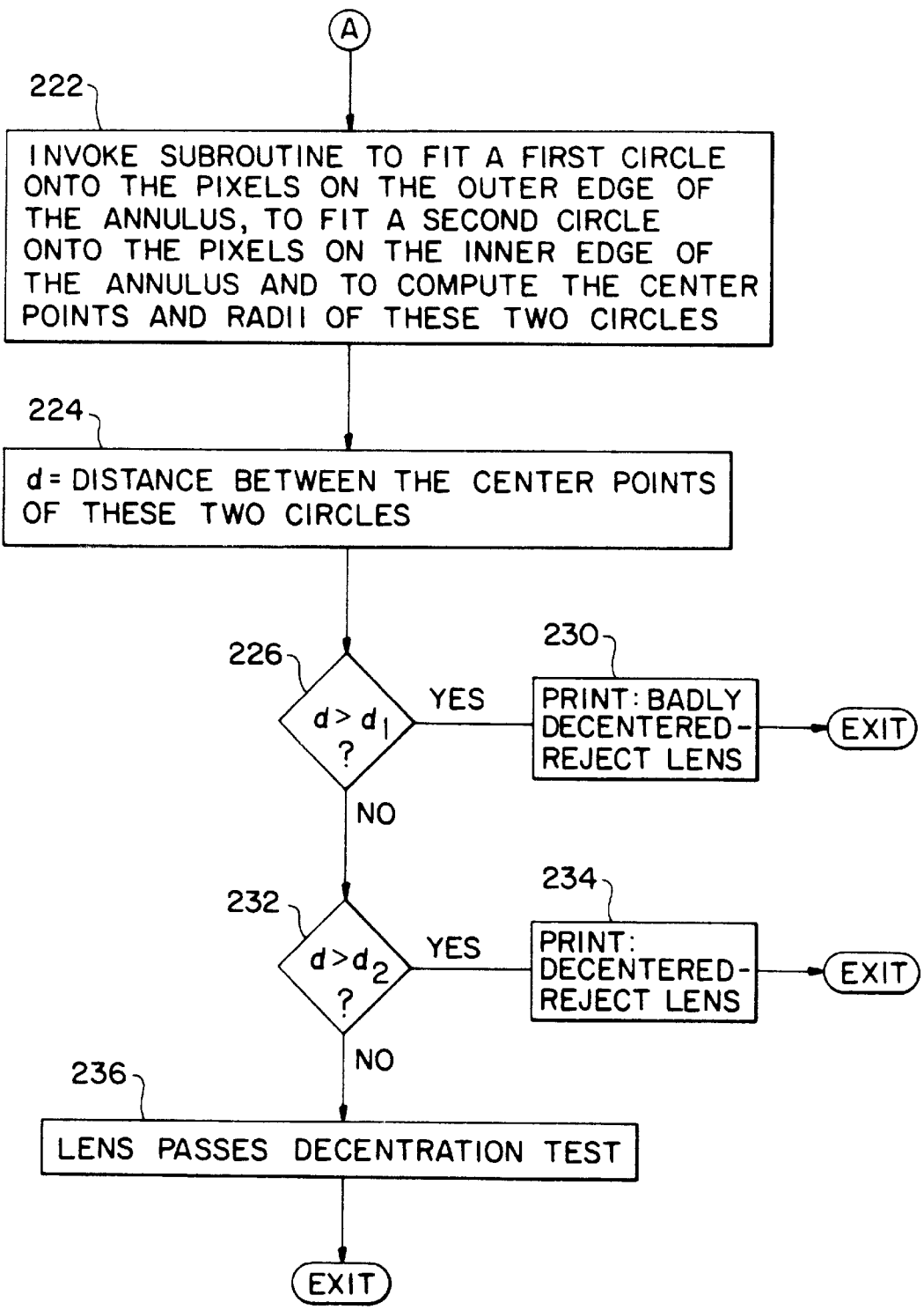

FIGS. 16a and 16b illustrate the decentration test or routine $R_1$. The first step 204 in this routine is referred to as a thresholding subroutine; and the purpose of this routine is to associate each pixel with a new intensity value $I_1$ equal to either the maximum or minimum illumination values, $T_{max}$ or $T_{min}$, depending on whether the original illumination value $I_0$ of the pixel is, respectively, above or below a given threshold value $T_t$. Thus, for example, each pixel having an original illumination value $I_0$ greater than 127 may be provided with a new illumination value $I_1$ of 255, and each pixel having an original illumination value of 127 or less may be provided with a new illumination value $I_1$ of zero.

The next step 206 in the decentration test is to set the number, locations, and sizes of the scans 202 used in this test, and this is done by providing the processor 64 with the address of the starting pixel and the length and direction of each scan. These parameters are chosen so that, unless the lens is badly decentered, each of a multitude of the scans cross both edges of annulus 150. Preferably, processor 64 or memory disc 70 is provided with a semi-permanent record of these starting addresses, directions and scan lengths. This record is used during the inspection of each lens of a given nominal type or size, and this semi-permanent record may be changed when lenses of a different nominal type or size are inspected.

Next, at step 210, the selected scans are made across the pixel array or display 46. Unless a lens is badly decentered, most of these scans will cross an illuminated portion of that display. When a scan crosses an illuminated portion of the display, the addresses of the first and last pixels of the line segment crossing that illuminated portion and the length of that line segment, referred to as the run length, are recorded in a file $f_1$. Subroutines for detecting the first and last pixels in a run length, for obtaining the addresses of those pixels, and for determining the length of each run length, are well-known by those of ordinary skill in the art, and any such suitable routines may be employed in the decentration test.

Then, at step 212, the length of each of these run lengths is compared to a predetermined value, and the data—that is, the addresses of the first and last pixel in the run length and the length of the run length—associated with each run length less than that predetermined value, are discarded. This discarding is done to eliminate, or at least to reduce the amount of, data caused by noise on the pixel array 46—that is, undesirable light that is incident on the pixel array. To elaborate, noise, which may be due to background light or to light that is deflected off the desired light path by dust or other particles, may produce illuminated areas on the pixel array. In the vast majority of instances, each of these illuminated areas consists of only one or a small group of adjacent pixels. If one of the above-mentioned scans made during step 210 crosses such an illuminated area, then the processor records the addresses of the first and last pixel of and the length of the run length across that illuminated area. This illuminated area and the associated data, however, are not related to annulus 150 or to the edges thereof, and thus step 212 is provided to eliminate this data.

The next step 214 in the decentration test is to identify each of the remaining pixel addresses as being on the outer edge or the inner edge of the annulus, and any suitable subroutine may be employed to do this. For instance, the addresses of the first and last pixel of each run length may be compared to each other; and the pixel closer to the center of the entire pixel array 46 may be considered as being on the inner edge of annulus 150, while the pixel further away from the center of the pixel array may be considered as being on the outer edge of the annulus. Alternatively, the scans may be separated into two groups such that for each scan in the first group, if an illuminated run length is found during the scan, the first and last pixels in the run length are on the outer and inner edges, respectively, of the annulus; and for each scan in the second group, if an illuminated run length is found during the scan, the first and last pixels in the run length are on the inner and outer edges, respectively,. of the annulus.

After each pixel is determined to be on the inside or the outside edge of annulus 150, then at step 216 the number of pixels that have been found on each edge is counted. If either of these numbers is less than three, then at step 220, the lens is rejected on the basis that the lens is badly decentered. If, though, at least three pixels have been found on each edge, then at step 222, a subroutine is invoked, first, to fit a first circle onto the pixels that were found on the outside edge of the annulus, second, to fit a second circle onto the pixels that were found on the inside edge of the annulus, and third to determine the centers and radii of these two circles. Numerous subroutines are well-known for fitting a circle onto three or more points and to calculate the center and radius of that circle, and any such subroutine may be used in the decentration test at step 222.

After the centers of these two fitted circles are calculated, the distance d between these two centers is determined at step 224. This distance is then compared, at step 226, to a first value $d_1$; and if the distance is greater than $d_1$, then the lens is rejected at step 230 as being badly decentered. If the distance d is less than $d_1$, then, at step 232, that distance d is compared to $d_2$, which is the maximum acceptable distance between the centers of the inner and outer edges of annulus 150. If the distance d between centers of the fitted circles is greater than $d_2$, then the lens is rejected; at step 234, as being decentered; however, if the distance d is equal to or less than $d_2$, then the lens passes the decentration test, as indicated by step 236.

Figure 17A:
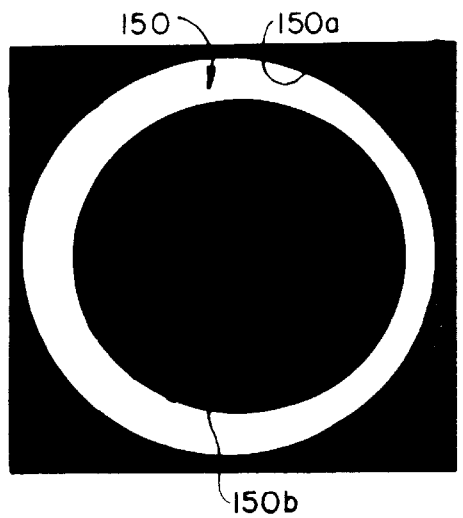
FIG. 17A is similar to FIG. 15 and shows the image of an ophthalmic lens formed on the pixel array.
Figure 17B:
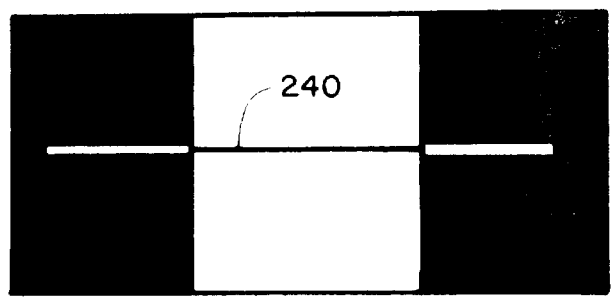
FIG. 17B is an enlarged view of a portion of the annulus shown in FIG. 17A.
Figure 17C:
FIG. 17C is a graph showing the intensities at which certain pixels, on a line segment across

If a lens passes the decentration test, processor 64 then initiates a process or routine $R_2$, referred to as edge detector, to produce a set of illumination values that, in turn, may be used to identify the pixels on the edges of annulus 150. Typically, these edges are not perfect circles and thus are different from the fitted circles found during the decentration test. This new set of illumination values is obtained through a series of morphological operations or changes in the original intensity values assigned to or associated with each pixel of array 46. These morphological changes are pictorially illustrated in FIGS. 17a through 17i, and shown in the form of a flow chart in FIG. 18. More specifically, FIG. 17a shows an image of annulus 150 on pixel array 46; and FIG. 17b shows an enlarged view of a portion of that annulus, and also shows a short line segment 240, or scan, across that annulus portion and the adjacent areas of the pixel array. FIG. 17c illustrates the intensity values $I_1$ of the pixels in that scan 240; and as represented therein, the pixels in the dark areas of FIG. 17b have a lower or zero $I_1$ value, and the pixels in the light areas of FIG. 17b have a higher $I_1$ value, such as $T_{max}$.

Figure 17D:
FIGS. 17D–17I graphically illustrate the results of various processes performed on the illumination intensity values of those certain pixels to derive processed values for the pixels that help identify the edges of the annulus shown in FIG. 17A.
Figure 18:
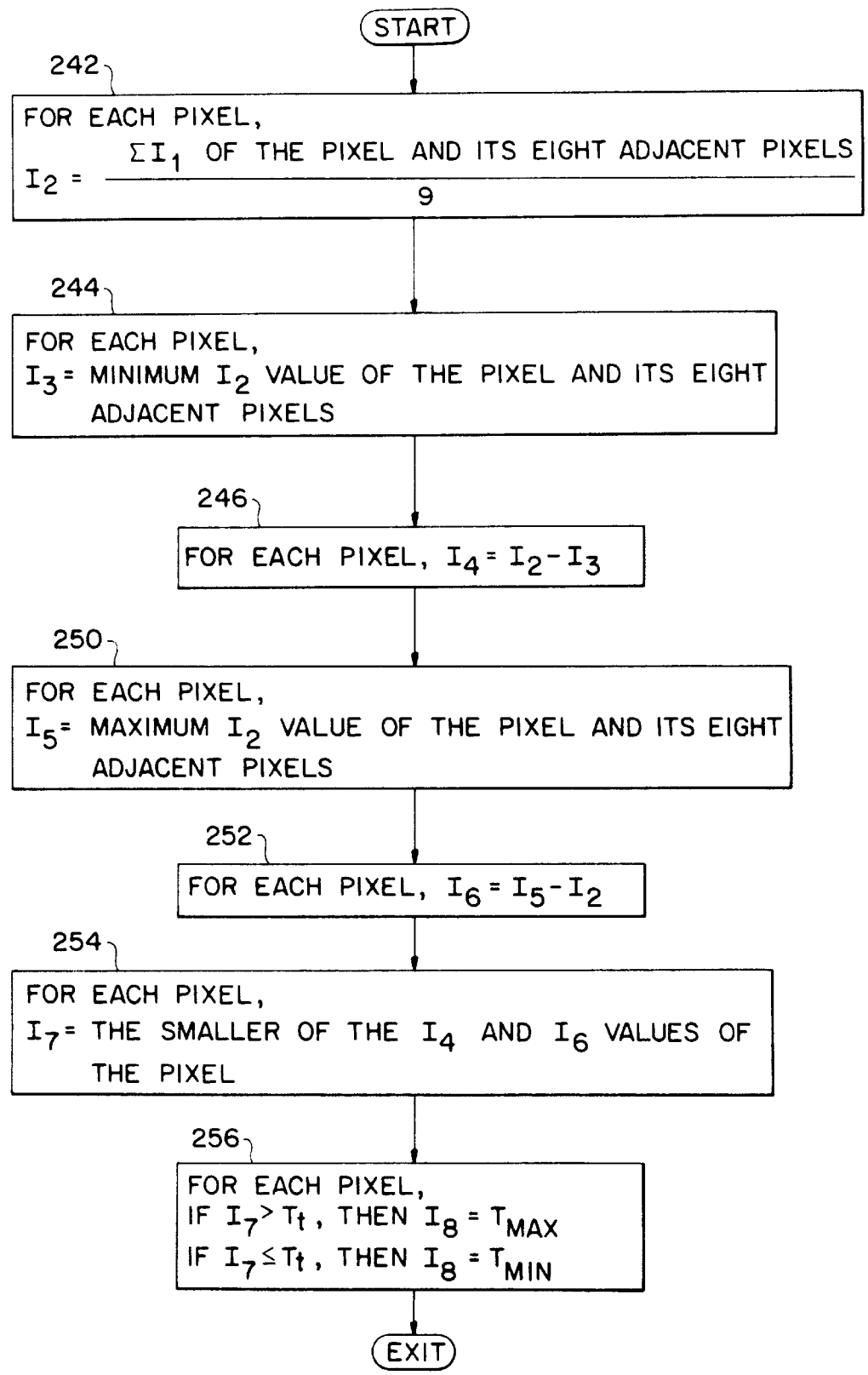
FIG. 18 is a flow chart showing a preferred procedure for processing the initial illumination intensity values determined for the pixels of the pixel array.

With reference to FIG. 18 and FIGS. 17c and 17d, in the first step 242 of the edge detector process, a new value $I_2$ is calculated for each pixel; and, in particular, the $I_2$ value for each pixel is set equal to the average of the $I_1$ values of that pixel and its eight immediately adjacent pixel neighbors. The difference between the $I_1$ and the $I_2$ values for the pixels in array 46 is that the latter values change more gradually between the pixels having the lowest $I_2$ value (which generally are those pixels in the dark areas of the pixel array), and the pixels having the highest $I_2$ value (which generally are those pixels in the light areas of array 46). This difference may be best understood by comparing FIGS. 17c and 17d.

Figure 17E:

Then, at step 244, a further value $I_3$ is determined for each pixel; and specifically, the $I_3$ value for each pixel is set equal to the minimum $I_2$ value of that pixel and its eight immediately adjacent pixel neighbors. With reference to FIGS. 17d and 17e, the $I_3$ values may vary across the scan 240 in a manner very similar to the way in which the $I_2$ values vary across that pixel scan. The principle difference between the manner in which the $I_2$ and $I_3$ values of the pixels vary across the pixel array is that the band of pixels having the highest $I_3$ value is slightly narrower than the band of pixels having the highest $I_2$ values.

Figure 17F:
Figure 17G:
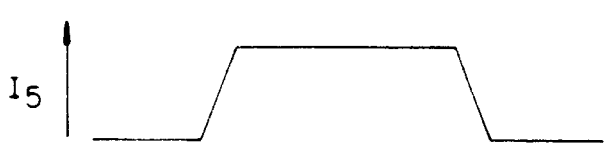

The next step 246 in the edge detector process is to determine a still further value $I_4$ for each pixel according to the equation $I_4=I_2-I_3$. With particular reference to FIG. 17f, most of the pixels in the scan 240 have $I_4$ values of zero; however, the pixels on and radially immediately inside the two edges of annulus 162 have positive $I_4$ values. Next, at step 250, an $I_5$ value is determined for each pixel; and more specifically, the $I_5$ value of each pixel is set equal to the maximum $I_2$ value of the pixel and its eight immediately adjacent pixel neighbors. For most of the pixels on the pixel array 46, the $I_5$ value of the pixel is the same as the $I_2$ value of the pixel. However, for the pixels within a given distance of the edges of annulus 150, the $I_5$ values of the pixel are greater than the $I_2$ values of the pixel, and the band of pixels having the highest $I_5$ value is slightly wider than the band of pixels having the highest $I_2$ value.

Figure 17H:
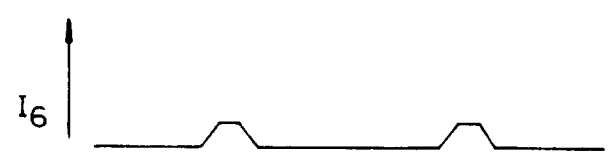
Figure 17I:

The next step 252 in the edge detector process is to determine a still further value $I_6$ for each pixel according to the equation $I_6=I_5-I_2$. With particular reference to FIG. 17h, most of the pixels on the pixel array will have $I_6$ values of zero; however, the pixels on and radially immediately outside the two edges of annulus 150 have positive $I_6$ values. Next, at step 254, an $I_7$ value is assigned to each pixel; and more specifically, the $I_7$ value of each pixel is set equal to the smaller of the $I_4$ and $I_6$ values for the pixel. With reference to FIG. 17i, most of the pixels on the pixel array have an $I_7$ value of zero; however, the pixels directly on and immediately adjacent the two edges of annulus 150 have positive $I_7$ values. In this way, the $I_7$ values of the pixels identify the pixels that are on the edges of annulus.

A thresholding subroutine may then be invoked at step 256 to sharpen the distinction between the pixels on the edges of annulus 150 and the other pixels in display 46. In particular, each pixel may be assigned a still further value $I_8$ equal to either the maximum illumination intensity value $T_{max}$ or the minimum illumination intensity value $T_{min}$ depending on whether the $I_7$ value of the pixel is, respectively, above or below a given threshold value such as $T_t$. Thus, for instance, each pixel having an $I_7$ value greater than 32 may be provided with an $I_8$ value equal to 255, and each pixel having an $I_7$ value of 32 or less may be provided with an $I_8$ value of zero.

Figure 17J:
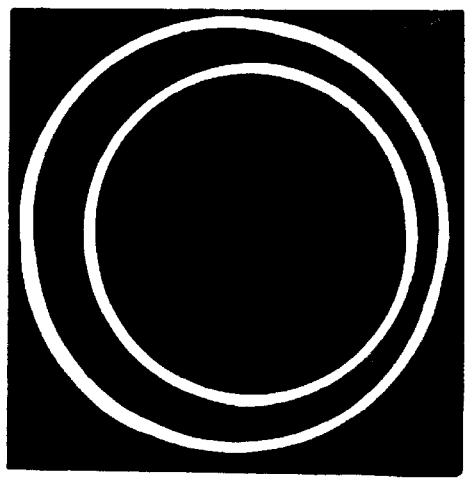
FIG. 17J shows the pixels of the pixel array illuminated at their processed illumination values.

FIG. 17j shows each pixel of array 46 illuminated at an intensity equal to its $I_8$ value.

During the calculation and processing of the $I_1$–$I_8$ values, preferably each set of pixel values is stored in a respective one memory register in preprocessor 62—that is, for example, the $I_0$ values are all stored in a first register, the $I_1$ values are all stored in a second register, and the $I_2$ values are all stored in a third register. It is not necessary to store all of the $I_1$–$I_8$ values during the entire processing period for each lens, however; and, for instance, during each processing period, the $I_3$ values may be discarded after the $I_4$ values are calculated, and the $I_5$ values may be discarded after the $I_6$ values are determined.

In addition, it is not necessary to calculate $I_1$–$I_8$ values for all the pixels in the array 46. For any ophthalmic lens of a given type, the annulus of the lens will appear in a relatively well-defined region or area of the pixel array 46, and it is only necessary to determine the $I_2$–$I_8$ values for the pixels in that region or area. However, as a practical matter, it may often be easier simply to calculate the $I_2$–$I_8$ values for all the pixels in array 46, rather than to add a further processing step to identify those pixels in the given area of interest.

Figure 19A:
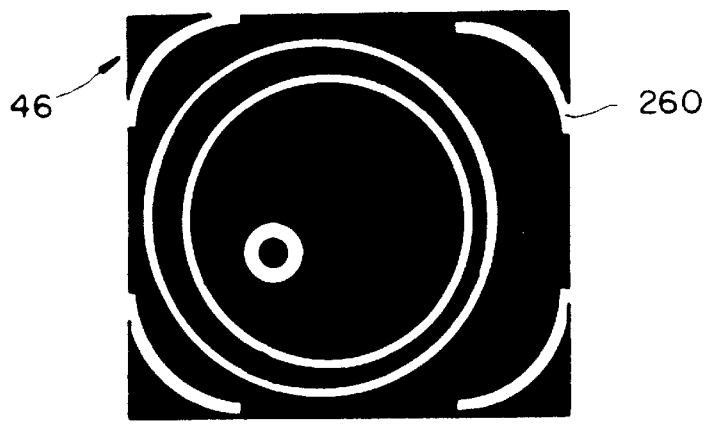
FIGS. 19A–19C show the effect of a masking procedure on data values for the pixels of the pixel array.

After the edge detector routine is completed, the lens inspection system invokes a masking routine to produce a set of pixel illumination values that is free of the effect produced by the edge of the lens inspection cup used to hold the lens. To elaborate, as an ophthalmic lens is illuminated by a flash of light from flash lamp 30, light is also transmitted through the cup holding the lens. The edge of the cup may diffract some of this light sufficiently enough to transmit the light past stop 40 and onto the pixel array 46, producing thereon an image or a partial image of the edge of the cup, as shown at 260 in FIG. 19*a*. This edge image is not related to the lens itself, and thus any data associated with that cup edge image are unnecessary and undesirable to the processing of the data associated with the lens image itself; and a masking routine is invoked to eliminate the cup edge image from pixel array 46, or more precisely, to produce a set of pixel illumination values that is free of the pixel data associated with the above-mentioned cup edge image 260.

Figure 20:
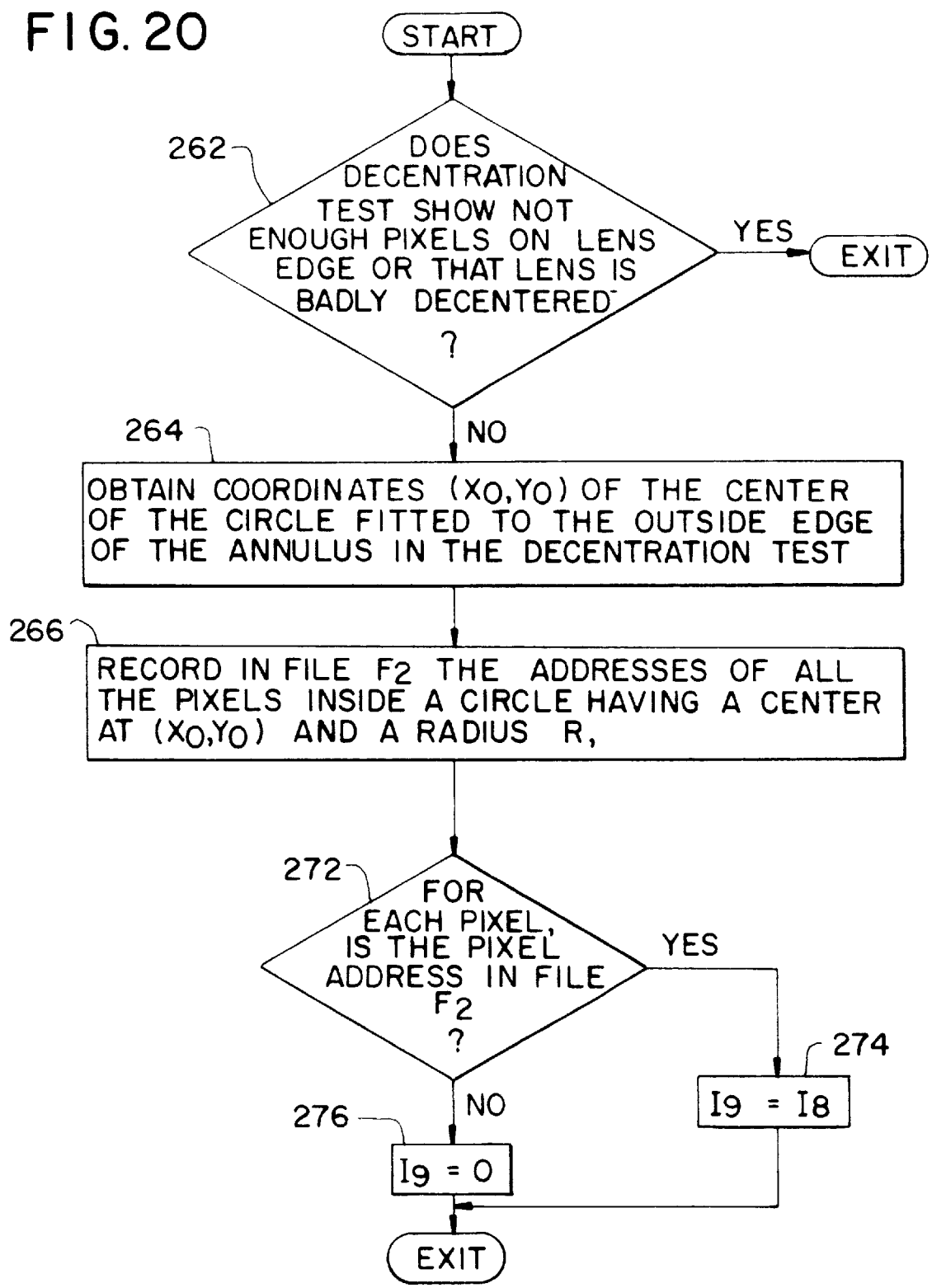
FIG. 20 is a flow chart illustrating a preferred masking procedure.

FIG. 20 is a flow chart illustrating a preferred masking routine $R_3$. The first step 262 in this routine is to determine whether, at steps 216 or 226 of the decentration test, at least three pixels had been found on the outside edge of annulus 162 or if the ophthalmic lens was found to be badly decentered. If the lens had been found to be badly decentered at either of these two steps of the decentration test, then masking routine $R_3$ itself terminates at step 262.

Figure 19B:
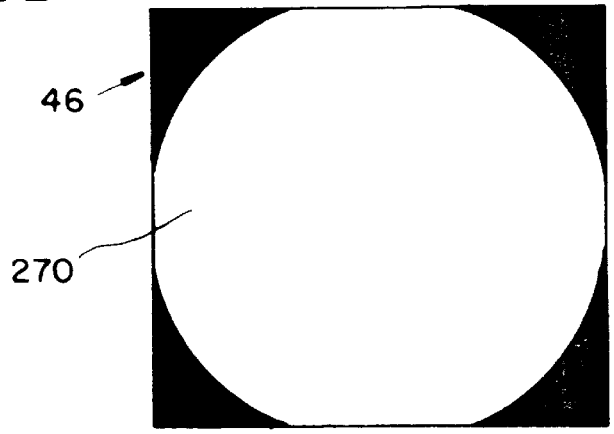

If routine $R_3$ does not terminate at step 262, the routine proceeds to step 264, which is to obtain the coordinates of the center of the circle that had been fitted to the outside edge 150*a* of annulus 150 during the decentration test. These coordinates had been determined and then stored in memory, either in the memory of processor 64 or in memory disc 70, during the decentration test, and thus, these coordinates can be obtained by simply retrieving them from the memory. Once these center coordinates are obtained, a mask subroutine is invoked at step 266. With reference now to FIG. 19*b*, this subroutine, in effect, superimposes over pixel array 46, a circular mask 270 centered on the above-mentioned center coordinates, and having a diameter slightly larger than the diameter of the circle fitted to the outer edge of annulus 150. The masking subroutine then assigns an $I_9$ value to each pixel based on whether the pixel is inside or outside this mask. In particular, for each pixel outside that mask, the masking subroutine assigns the pixel an $I_9$ value of zero; and for each pixel inside the mask, the masking subroutine assigns the pixel an $I_9$ value equal to the $I_8$ value for the pixel.

More precisely, at step 266, the coordinates $(x_0, y_0)$ of the above-mentioned center point and a radius value $r_1$, which is selected to be slightly larger than the radius of the circle fitted to the outside edge of annulus 150, are transmitted to the mask subroutine. Then this subroutine forms a file $f_2$ of the addresses of all of the pixels in array 46 that are within the distance $r_1$ of that center point $(_0, y_0)$. Then, at step 272, the address of each pixel in array 46 is checked to determine if it is in that file. If the pixel address is in that file, then at step 274 the $I_9$ value of the pixel is set equal to the $I_8$ value of the pixel; however, if the pixel address is not in that file, then at step 276 the $I_9$ value of the pixel is set to zero.

Numerous specific mask subroutines are well-known in the art and may be employed at step 266 of routine $R_3$.

Figure 19C:
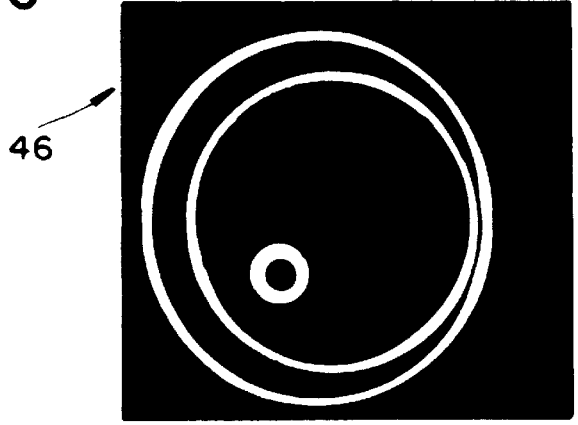

FIG. 19*c* shows the pixels of array 46 illuminated at an intensity equal to their respective $I_9$ values.

Figure 21A:
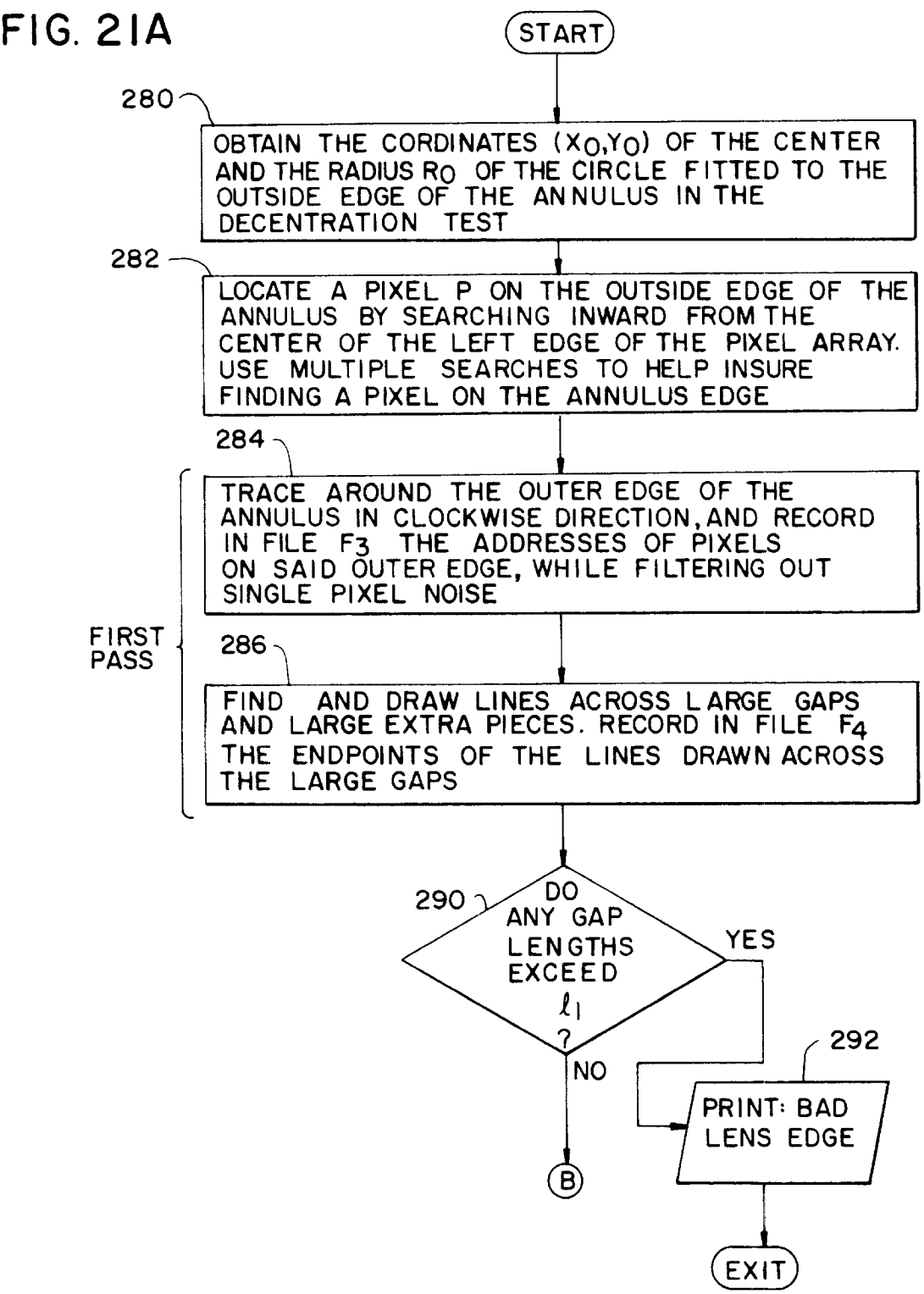
FIGS. 21A and 21B illustrate a further data processing procedure referred to as the rubber band algorithm.
Figure 21B:
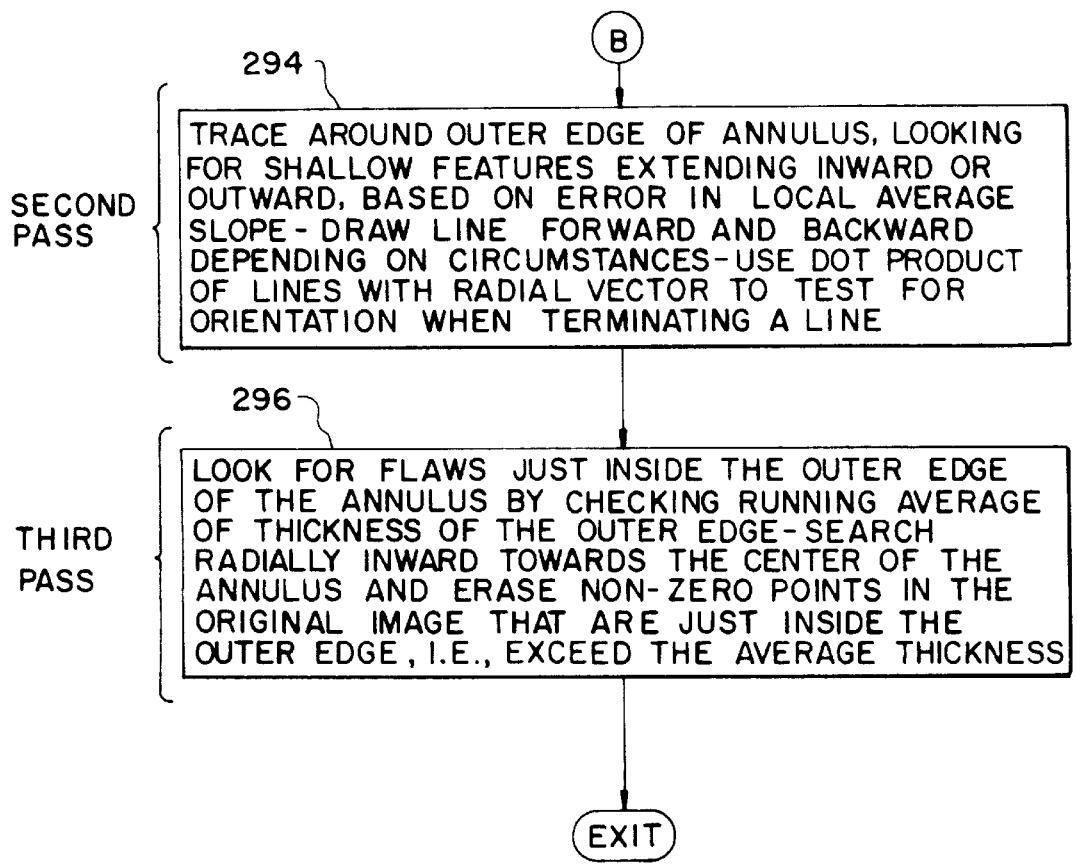

After the masking procedure shown in FIG. 20 is completed, processor 64 initiates a further procedure, referred to as the rubber band algorithm. This algorithm, generally, involves analyzing and processing data values for or relating to the pixels in and immediately adjacent to the annulus edge 150*a*, and FIGS. 21*a* and 21*b* show a flow chart that generally illustrates the rubber band algorithm. With reference to these Figures, the first step 280 in this algorithm is to obtain the center coordinates and the radius of the circle fitted to the outer edge 150*a* of the lens in the decentration test. As discussed above, these values had been determined and then stored in memory during the decentration test, and these values can be obtained by retrieving them from that memory.

The next step 282 in the rubber band algorithm is to locate a pixel on the outer edge 150*a* of annulus 150 by searching inward from the left edge of pixel array 46, until an illuminated pixel is found. It is possible that the first illuminated pixel found during a given search might not be on the edge of the image of the lens, but might be somewhere else and illuminated because of background noise. Hence, preferably, a multitude of scans or searches are conducted at step 282 to find a multitude of illuminated pixels, and the locations of these pixels are then analyzed or compared to each other to help ensure that a pixel is found on the edge of the lens image.

Once a first pixel is found on the edge of the lens image, the rubber band algorithm proceeds to step 284; and at this step this algorithm, in effect, starts at this first pixel and traces all the way around the edge of the lens image, eventually returning to that first pixel. During this first trace, the algorithm records in file $f_3$ the addresses of most or all of the pixels on the outside edge of the lens image; and the algorithm also identifies larger gaps in the lens edge, the lengths of those gaps, and larger extra pieces on the lens edge. At step 286, the algorithm records in file $f_4$ the addresses of the pixels that are the end points of selected lines, discussed in greater detail below, that in effect are drawn across any larger gaps in the lens edge and across and on either side of any larger extra pieces on that edge.

After this first pass or trace around the lens image is completed, the rubber band algorithm then determines, at step 290, if any gap that might have been found is large enough to cause the lens to be rejected. If such a gap is found, the lens is rejected, and at step 292, the printer 76 prints the message that the lens has a bad edge.

If the lens passes this gap test at step 290, the rubber band algorithm proceeds to make a second pass or trace around the edge of the lens image. In this second pass, as indicated at 294 in FIG. 21*b*, the algorithm identifies shallow features, such as smaller gaps and smaller extra pieces, extending either radially inward or outward along the outside edge of the lens, and the algorithm tests each such detected feature to determine if the lens should be rejected because of it. Generally, this is done by computing, for each of at least selected pixels on the outside edge of the lens, the dot product of two vectors, referred to as the radial vector and the edge vector, through that pixel. The radial vector through a pixel is that vector that also extends through the center point of the circle fitted to the outside edge 150a of annulus 150. The edge vector through a pixel is the vector that extends through that pixel and a second pixel on the outside edge of annulus 150, a given number of pixels rearward, or counterclockwise, from the former pixel along the outside edge 150a of annulus 150.

For any pixel on a regular, circular portion of the lens edge that does not contain any defect—either a gap or an extra piece—the dot product of the two above-identified vectors will be substantially zero, because the radial and edge vectors through that pixel are substantially perpendicular. However, for most or all pixels on the edge of a gap or an extra piece on the lens edge, the dot product of the edge and radial vectors through that pixel will not be zero, because these two vectors are not perpendicular. If any calculated dot product is greater than a given value, then the lens is considered as not suitable for consumer use and may be rejected.

If the lens passes the tests applied during the second pass around the lens edge, then the rubber band algorithm makes a third pass around the edge of the lens image, as represented by step 296 in FIG. 21B. This third pass does not include any test to determine if the lens should be rejected, but instead involves processing or preparing data for subsequent tests. In particular, this third pass is made to produce a set of data values that is free of data associated with any defects in the lens that are just inside the outer edge 150a of annulus 150. This set of data values is subsequently subtracted from a set of data values containing data associated with those defects, to produce thereby a set of data values having only the data associated with those flaws.

Generally, in this third pass around the lens edge, the rubber band algorithm determines the average radial thickness of the outside edge 150a of the annulus 150; and then the algorithm sets to zero the $I_9$ values of all the pixels that are just inside that outside edge of the annulus. For example, if the outside edge of the annulus has an average thickness of six pixels, then the rubber band algorithm may set to zero the $I_9$ values of all of the pixels that are between 7 and 27 pixels radially inward of the outside edge of the annulus.

Figure 22:
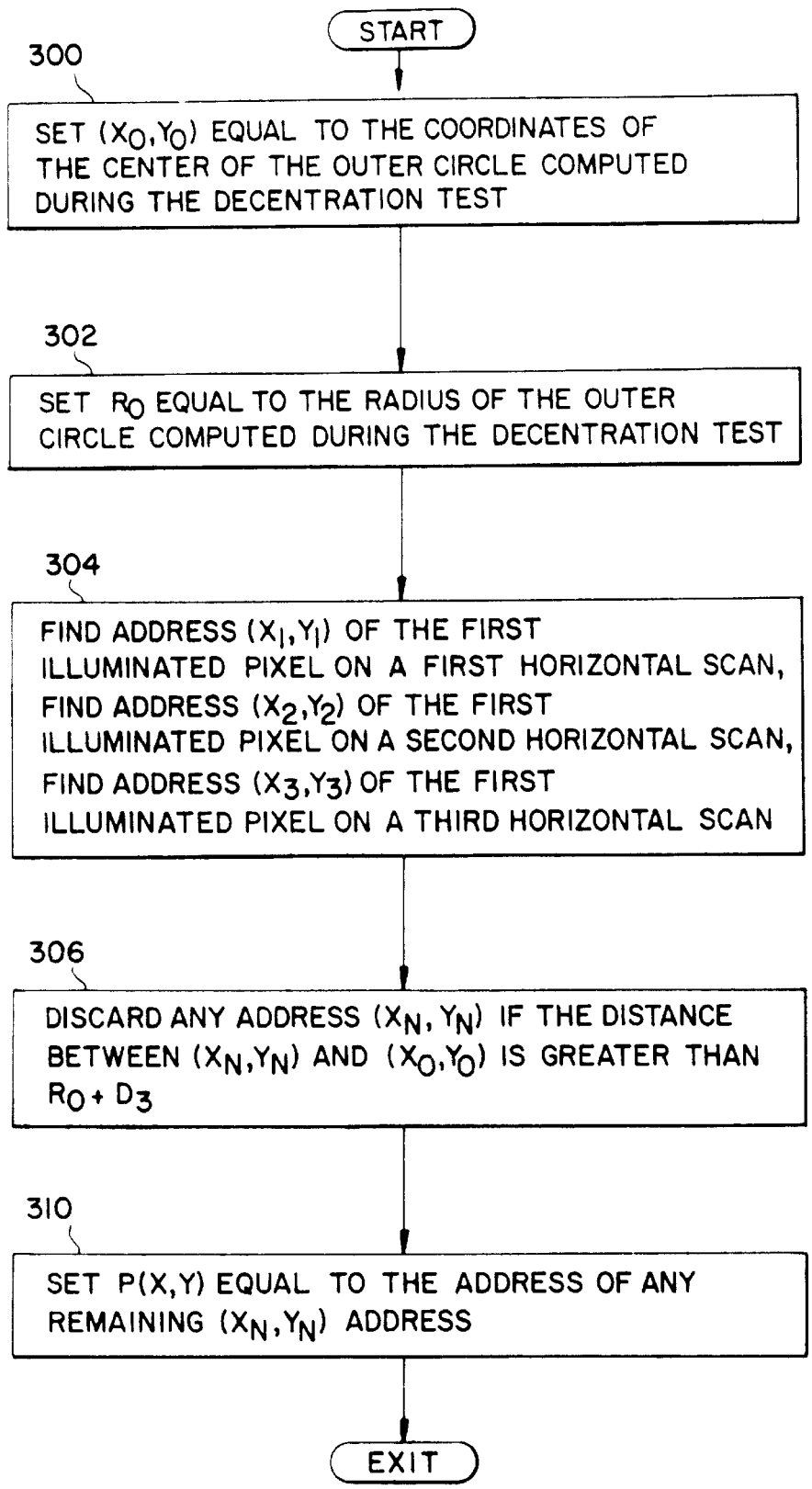
FIG. 22 shows a subroutine used to identify a first pixel on the edge of the line image.

FIGS. 22–32 illustrate the rubber band algorithm in more detail. More specifically, FIG. 22 illustrates one suitable subroutine $S_1$ for locating a first pixel, P(x, y), on the outer edge 150a of the annulus 150. At step 300, $(x_0, y_0)$ is set equal to the coordinates of the center of the circle that was fitted to the outer edge of the annulus during the decentration test; and at step 302, $r_0$ is set equal to the radius of that outer fitted circle. Then, as represented by step 304, a multitude of horizontal scans are made across the pixel array 46, starting at, or about at, the center of the left edge of the array. More precisely, processor 64 studies data values $I_9$ at addresses in the preprocessor memory that correspond to the addresses of pixels in selected horizontal line segments on the pixel array. During each of these scans, the processor 64 checks the $I_9$ value of each pixel in a given horizontal row of pixels, and identifies the first pixel in that row that has an $I_9$ value above a given value; and preferably, a multitude of such scans are made, resulting in a multitude of identified pixels.

Typically, all of these identified pixels will be on the outer edge 150a of the annulus 150. It is possible, though, that a pixel somewhere on the array and to the left of that edge might have a high $I_9$ value due to background noise or stray light incident on the pixel during the lens inspection procedure, and such a pixel might be identified as an illuminated pixel in the above-mentioned scans. To prevent such a pixel from being identified as an edge pixel, subroutine, $S_1$, at step 306, identifies and discards the addresses of any such pixels. More specifically, the subroutine, first, determines the distance between each of the pixels identified in the scans and the center $(x_0, y_0)$ of the outer circle fitted to the outside edge of the lens image during the decentration test; and second, compares each determined distance to $r_0$, which had been set equal to the radius of that fitted outer circle. If the distance between a particular pixel and the center of that fitted circle exceeds $r_0$ by more than a given distance, $d_3$, then that pixel is considered as not being on or immediately adjacent the edge of annulus 150, and the address of that pixel is discarded. After the addresses of all the pixels found during the scan are checked to determine if they are on or immediately adjacent the lens edge—and the ones that are not are discarded—then, as shown at step 310, any remaining pixel address may be selected as pixel P(x, y), and then the first pass around the edge of the lens image is begun.

Figure 23:
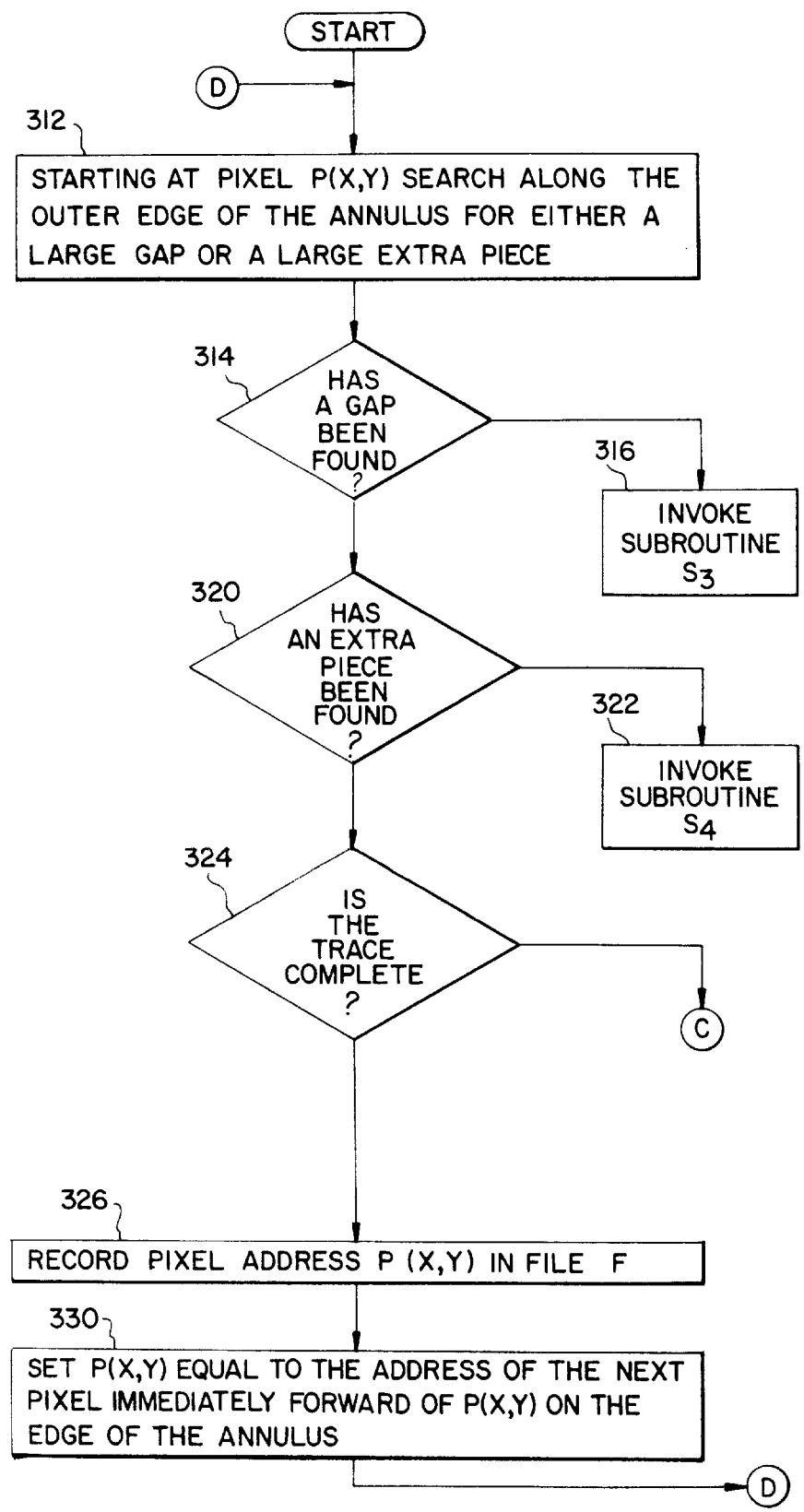
FIG. 23 is a flow chart showing in greater detail a first main section of the rubber band algorithm.

FIG. 23 illustrates in greater detail how this first pass is made, and in particular, shows Routine $R_4$ for making this pass. Starting at pixel P(x, y), at step 312, the algorithm searches forward, or clockwise, along the outer edge of the annulus 150 for either a large gap in that edge, or a large extra piece on that edge, as represented by steps 314 and 320. Any suitable subroutine or procedure may be used to search along the edge. For instance, from each given pixel on that edge, starting with pixel P(x,y), the processor may check the three or the five closest pixels in the row above or below the given pixel or in the column to the right or to the left of the given pixel, depending on the quadrant or sector of display 46 in which the given pixel is located, to identify the next pixel on the lens edge. From this next pixel, the processor may use this same procedure to identify the still next pixel on the lens edge.

Also, for each pixel that is found on the lens edge, the processor may determine the distance, r, between that pixel and the center point $(x_0, y_0)$ of the circle fitted to the outside edge of the lens. The processor may conclude that a large gap has been found when, for each of a given number of consecutive pixels on the lens edge, r is smaller than $r_0$ by more than a given amount $d_g$ (that is, $r_0-r>d_g$). Conversely, the processor may conclude that a large extra piece has been found when, for each of a given number of consecutive pixels on the lens edge, r is greater than $r_0$ by more than a given amount $d_{ep}$ (that is, $r-r_0>d_{ep}$).

If a gap or an extra piece is found, subroutines $S_2$ or $S_3$, both of which are discussed in greater detail below, are invoked respectively at steps 316 and 322. If neither a gap nor an extra piece is found, then routine $R_4$ moves on to step 324.

At step 324, routine $R_4$ tests to determine if the first pass around the edge of annulus 150 is complete, and any suitable specific procedure or subroutine may be used to do this. For instance, as mentioned above, as the trace is made around the image of the lens edge, a file $f_3$ is made of the addresses of the pixels that have been found on that edge. At step 324, that file may be checked to determine if the address of the current edge pixel being considered is already on the file. If the pixel address is already on the file, then the first pass around the image of the lens edge is considered to be complete, while the pass is considered as not complete if this current pixel address is not already on file $f_3$. If the first pass is complete, then the rubber band algorithm moves onto routine $R_5$; but if the first pass around the lens is not complete, the algorithm moves on to step 326 and the address of this current edge pixel being considered is added to file $f_3$. Then at step 330, the next pixel on the lens edge is found and P(x, y) is set equal to the address of this next pixel, and the routine $R_4$ then returns to step 312.

Figure 24:
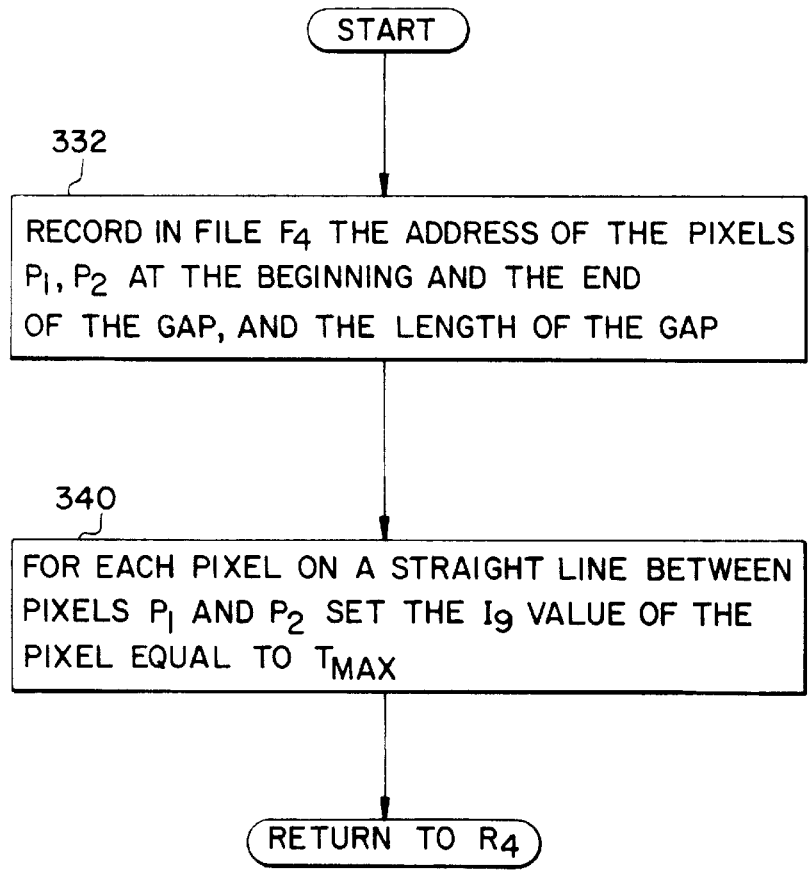
FIG. 24 is a flow chart showing a subroutine that is invoked when a gap is found in the outside edge of the image of the lens.

FIG. 24 is a flow chart outlining subroutine $S_2$, which is invoked each time a gap is found on the outside edge of annulus 150. The first step 332 in this subroutine is to identify and record in a file $f_4$ the address of the pixels at the beginning and the end of the gap and the distance between these two end pixels. These two pixels are shown at $P_1$ and $P_2$ respectively in FIG. 25A. Once a gap is found—that is, for each of a given number of consecutive pixels on the lens edge, r is smaller than $r_0$ by more than $d_g$—the last pixel on the lens edge before that given number of consecutive pixels may be considered as the pixel at the beginning of the gap.

Also, once a gap has been found, the end of the gap may be found by searching across the gap, along the pixels on the circle fitted to the outside edge of the lens in the decentration test, and searching radially inwardly and outwardly for a given number of pixels from that portion of the fitted circle, until the lens edge is found—that is, until illuminated pixels, or more precisely, pixels having high $I_9$ values are found. After the lens edge is found, the gap may be considered as having come to an end once a series of consecutive pixels is found that are all within a certain distance of that fitted circle; and in particular, when for each pixel in that series, $r_0$–r is less than $d_g$. The last pixel on the lens edge before that series of consecutive pixels may be considered as the pixel at the end of the gap.

Figure 25A:
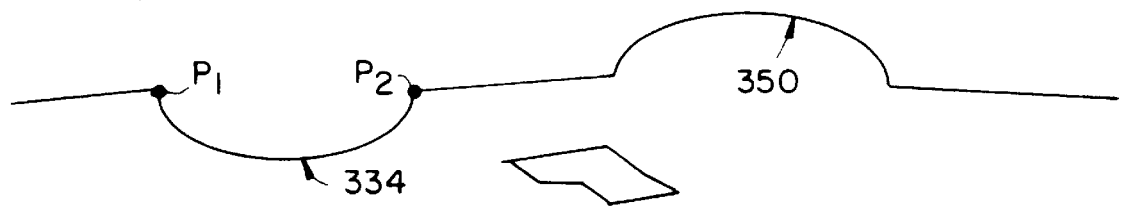
FIG. 25A–25E show a portion of the outside edge of the image of the lens and identify various pixels of interest on that edge.
Figure 25B:
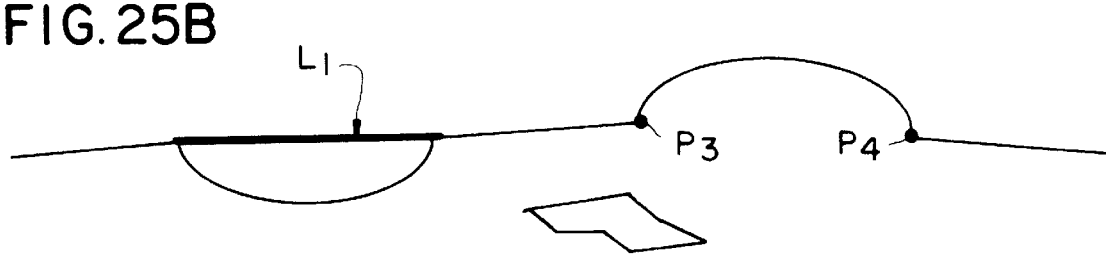
Figure 25C:
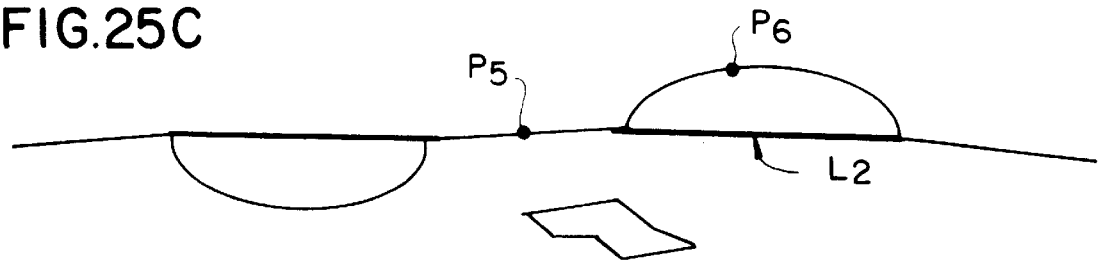
Figure 25D:
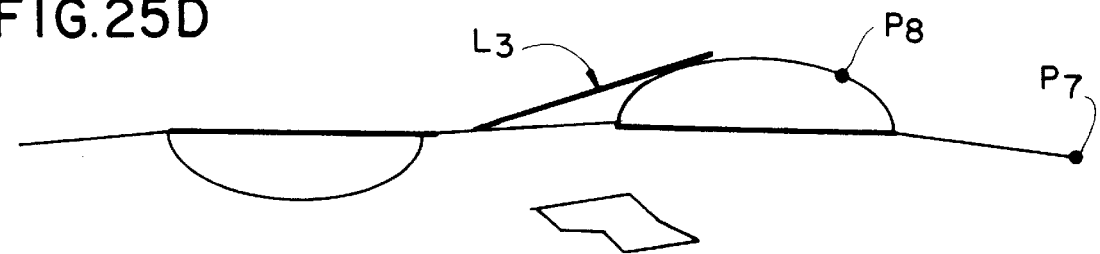
Figure 25E:
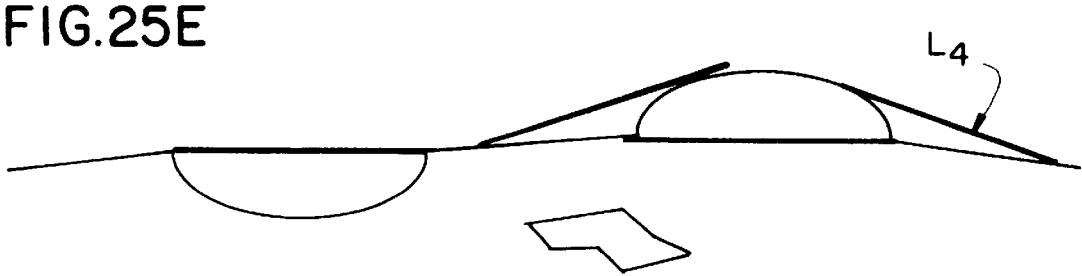

At step 340 of subroutine $S_2$, the $I_9$ values of the pixels on the line between pixels $P_1$ and $P_2$—the line segment $L_1$ in FIG. 25b—are set equal to the maximum illumination intensity value, and then the subroutine returns to routine $R_4$.

Figure 26:
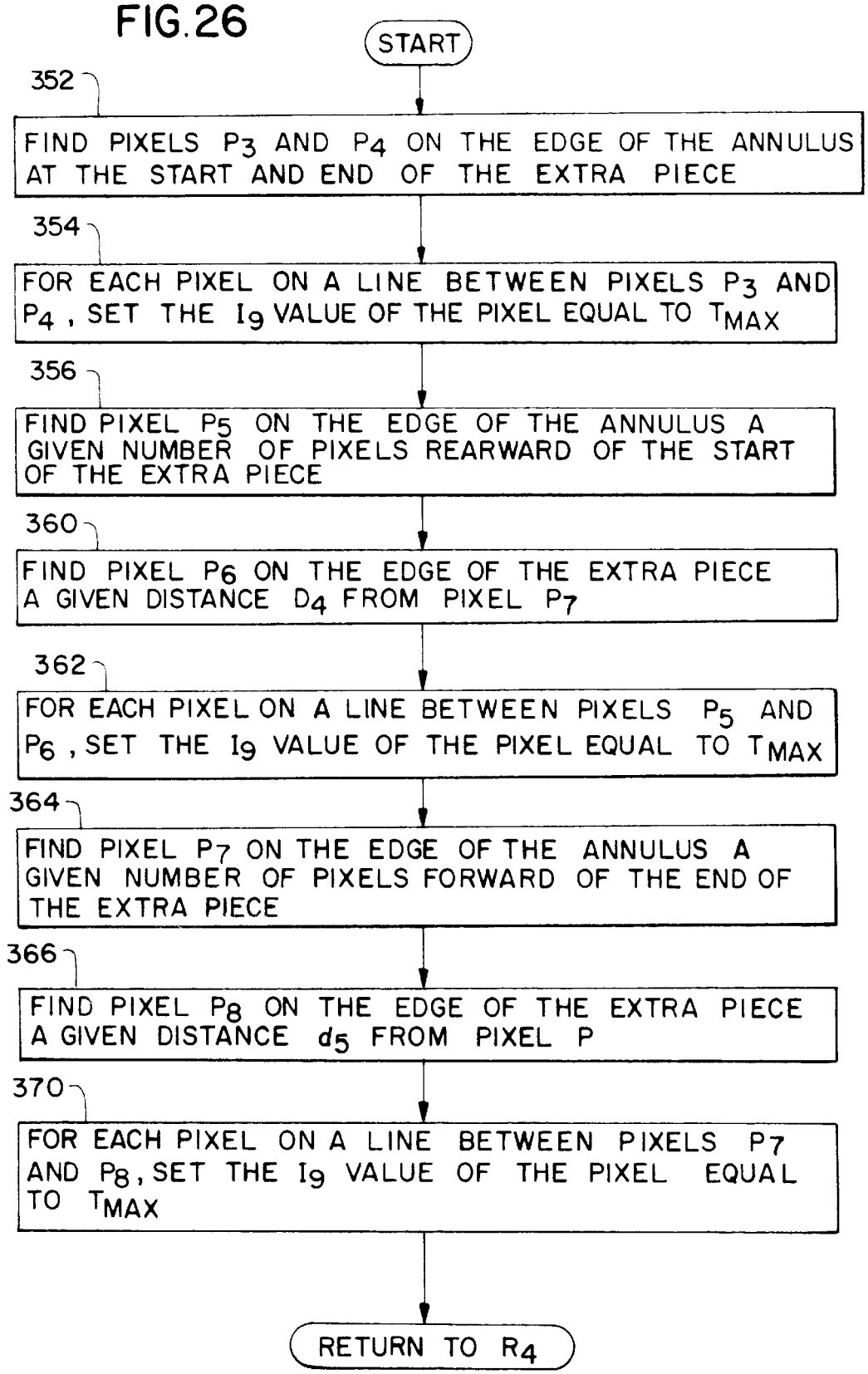
FIG. 26 is a flow chart of a subroutine that is invoked when an extra piece is found on the outside edge of the lens image.

FIG. 26 shows a flow chart illustrating subroutine $S_3$, which is invoked at step 322 of routine $R_4$ when an extra piece 350 is found on the edge of annulus 150. The first few steps in routine $S_3$ are done, in effect, to draw various bridge lines relating to the extra piece. In particular, at step 352, the subroutine identifies pixels $P_3$ and $P_4$, shown in FIG. 25b, on the edge of the annulus 150 at the start and at the end of the extra piece 350; and then, at step 354, the $I_9$ value of each pixel on a line segment $L_2$, shown in FIG. 25c, between pixels $P_3$ and $P_4$, is set to $T_{max}$. Next, at step 356, the subroutine identifies the address of a pixel $P_5$ that is on the edge of the annulus 150 a given number of pixels rearward, or counterclockwise, of the start of the extra piece 350; and at step 360, the pixel $P_6$ on the edge of the extra piece that is a given distance $d_4$ from pixel $P_5$ is found. Next, at step 362, and also with reference to FIG. 25d, the $I_9$ value of each pixel on a line $L_3$ between pixels $P_5$ and $P_6$ is set to $T_{max}$.

Next, at step 364, the subroutine identifies the address of another pixel $P_7$ that is on the edge of the annulus 150 a given number of pixels forward, or clockwise, of the end of the extra piece; and then, at step 366, the subroutine identifies the pixel $P_8$ on the edge of the extra piece that is a given distance $d_5$ from pixel $P_7$. At step 370, the $I_9$ value of each pixel on the line $L_4$, shown in FIG. 25e, between pixels $P_7$ and $P_8$ is also set to $T_{max}$. After the appropriate bridge lines are drawn, the subroutine returns to routine $R_4$.

Figure 27:
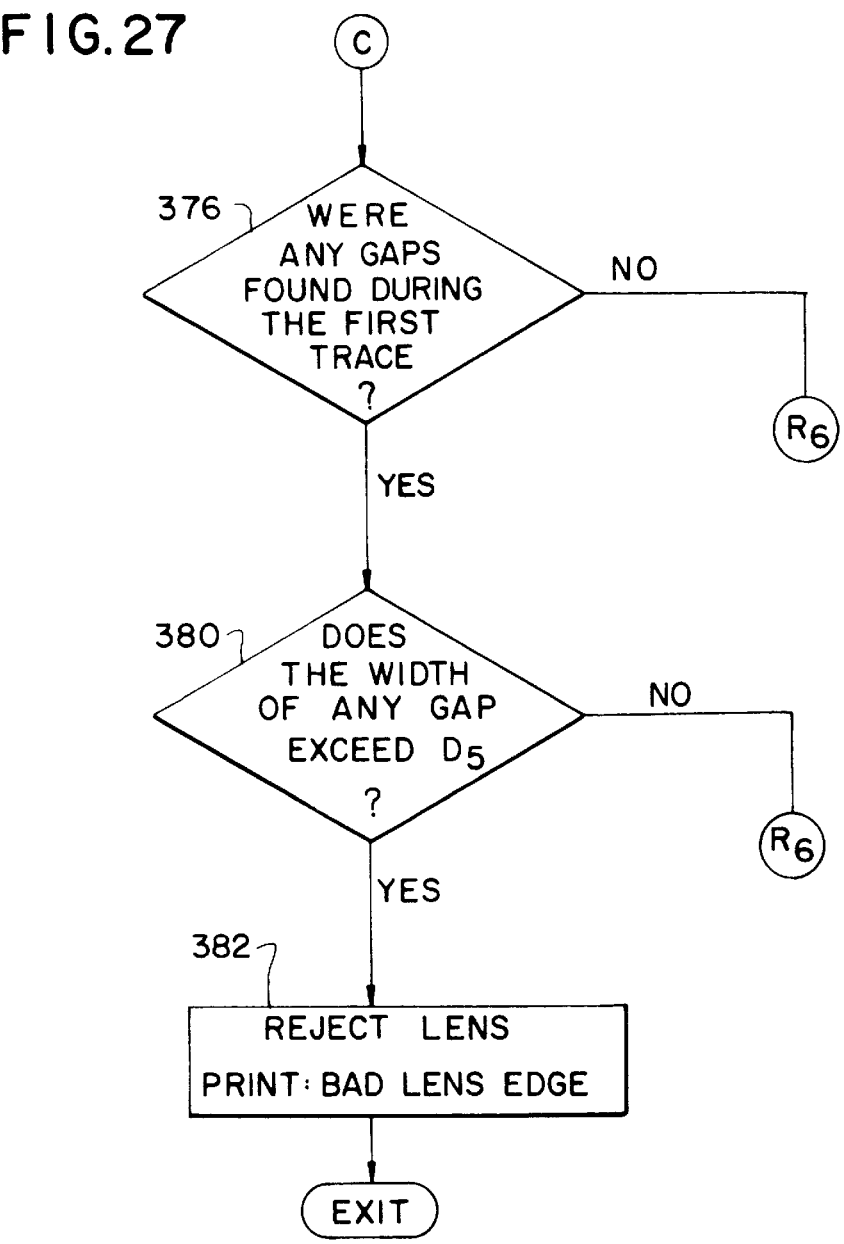
FIG. 27 shows a routine that is invoked after the procedure outlined in FIG. 23 is complete.

After the first pass around the image of the lens edge is completed, subroutine $R_5$ is invoked. This routine, which is illustrated in FIG. 27, is used to determine if any of the gaps, which may have been found during the first pass around the image of the lens edge, is wide enough to make the lens unsuitable for consumer wear. The first step 376 in routine $R_5$ is to determine if any gaps were in fact found during the first pass around the lens edge. If no gaps were found, routine $R_5$ itself is terminated and the rubber band algorithm proceeds to routine $R_6$. However, if any gaps were found during the first pass around the lens edge, routine $R_5$ proceeds to step 380. At this step, each gap width is compared, one at a time, to a given value $d_5$; and if any gap width is greater than that value $d_5$, then the lens is considered to be unsuitable for consumer use, and the lens is rejected at step 382. If all of the gap widths are less than $d_5$, however, then routine $R_5$ terminates, and the rubber band algorithm proceeds to routine $R_6$, which performs the second pass or trace around the image of the lens edge.

Figure 28:
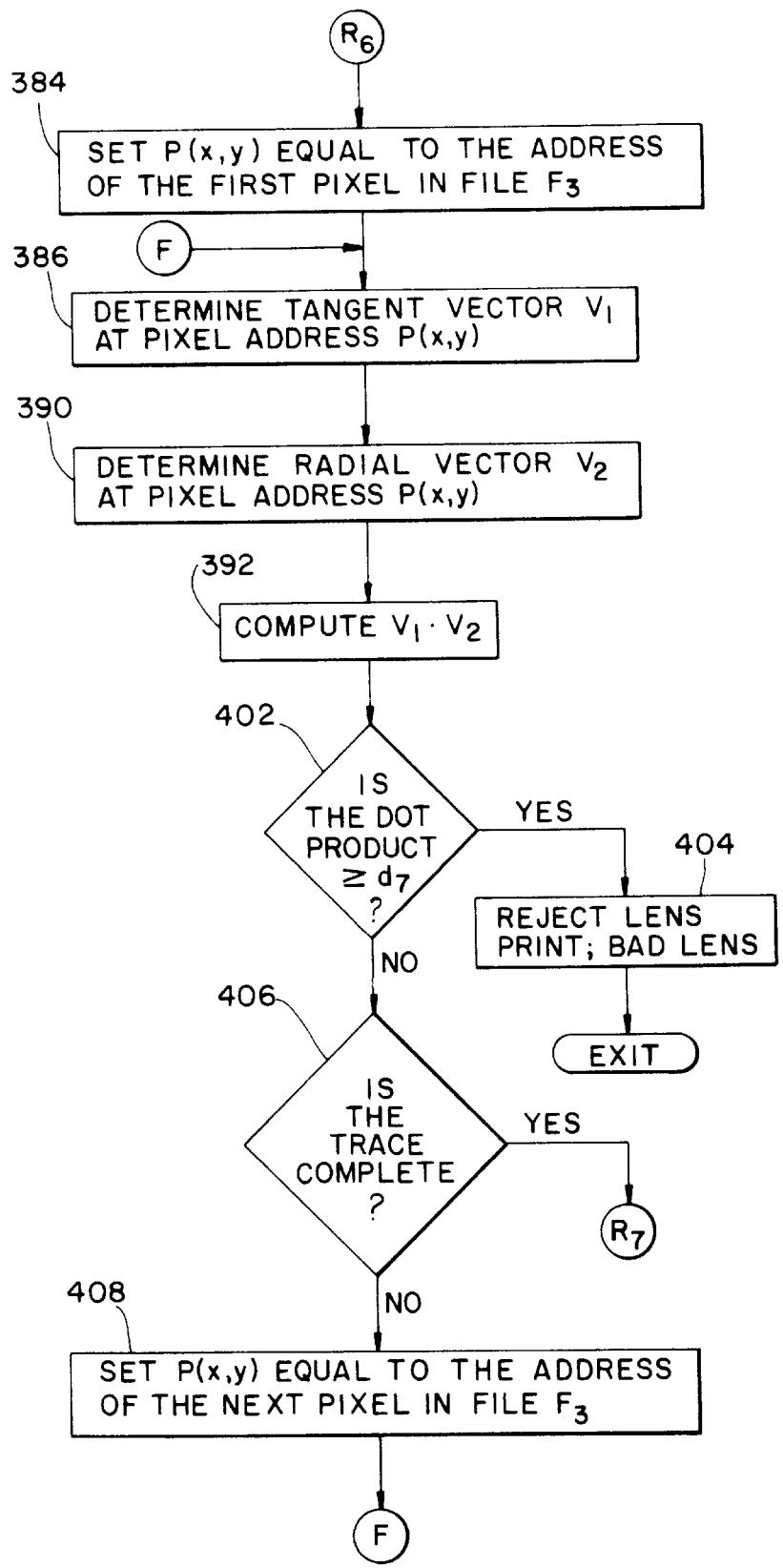
FIG. 28 is a flow chart showing in greater detail a second main section of the rubber band algorithm.

Routine $R_6$ is illustrated in FIG. 28. As previously mentioned, this routine primarily searches for shallow gaps in the lens edge and small extra pieces on the lens edge that were not identified as gaps or extra pieces in routine $R_4$, which was the first pass around the lens edge. In particular, at step 384, the address of pixel P(x, y) is set equal to the address of the first pixel in file $f_3$. Then, at steps 386, 390, and 392, two vectors $V_1$ and $V_2$, referred to as edge and radial vectors respectively, are identified and the dot product of these two vectors is calculated. More specifically, the first vector $V_1$ is the vector through pixel P(x, y) and a second pixel on the lens edge, a given number of pixels rearward or counterclockwise of pixel P(x, y) along that lens edge, and the second vector $V_2$ is the radial vector of the annulus 150 that extends through pixel P(x, y). The slopes of these two vectors and their dot product can be easily determined from the addresses of the pixels through which the vectors extend.

Figure 29:
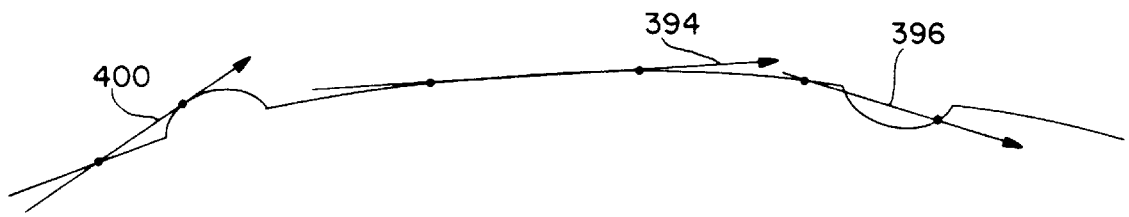
FIG. 29 shows the outer edge of a portion of the lens image, and shows several vectors that are used in the second section of the rubber band algorithm.
Figure 31:
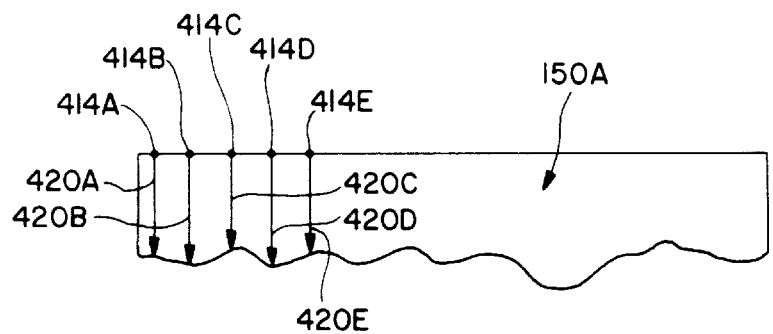
FIGS. 31 and 32 pictorially illustrate the effect of two steps of the procedure shown in FIG. 30.

With reference to FIG. 29, if pixel P(x, y) is along a regular, circular portion of the lens edge, then the edge vector $V_1$ through the pixel is substantially tangent to the lens edge, as shown at 394 in FIG. 29. Also, this vector $V_1$ is substantially perpendicular to the radial vector $V_2$ through that pixel, and the dot product of these two vectors $V_1$ and $V_2$ is substantially zero. However, if pixel P(x, y) is on an irregular portion of the lens edge, such as on the edge of a gap or of an extra piece on the lens, as shown at 396 and 400 in FIG. 29, then the edge vector $V_1$ and the radial vector $V_2$ through pixel P(x, y) are not normally perpendicular, and the dot product of these two vectors will normally not be zero.

The dot product of these two vectors $V_1$ and $V_2$ is compared, at step 402, to a given value $d_7$. If that dot product is equal to or greater than that given value—which indicates that an appreciable gap or extra piece is present in the area of pixel P(x, y)—then the lens is considered unacceptable for consumer use and is rejected at step 404, and the entire routine $R_6$ terminates. If at step 402, the calculated dot product is less than $d_7$—which indicates that in the area of pixel P(x, y), any departure of the lens edge from a perfect circle is within an acceptable limit—then routine $R_6$ moves on to step 406. At this step, the routine tests to determine if this second pass or trace around the image of the lens edge is complete. This is done, more specifically, by testing to determine if pixel P(x, y) is the last pixel on file $f_3$. If it is, then the second pass is complete, and the rubber band algorithm proceeds to routine $R_7$. If, though, at step 406, it is determined that this second pass around the lens edge image is not complete, then at step 408, the address of pixel P(x, y) is set equal to the address of the next pixel on file $f_3$, and then the routine returns to step 386. Steps 386 through 408 are repeated until either the lens is rejected or, for each pixel on file $f_3$, the associated dot product of the two vectors $V_1$ and $V_2$ through that pixel has been calculated and found to be less than $d_7$, at which time the rubber band algorithm proceeds to routine $R_7$, which performs the third pass or trace around the lens edge.

Preferably, the above-mentioned dot product is not calculated for all the pixels on the lens edge, and in particular, that product is not calculated for the pixels that are on the edges of gaps or extra pieces that were found during the first trace around the lens edge. It is not necessary to calculate this dot product for these gap and extra piece pixels since it is already known that the pixels are on either a gap or an extra piece, and an appreciable amount of processing time may be saved by not determining the $V_1$ and $V_2$ vectors through those pixels and the dot product of those two vectors.

Figure 30:
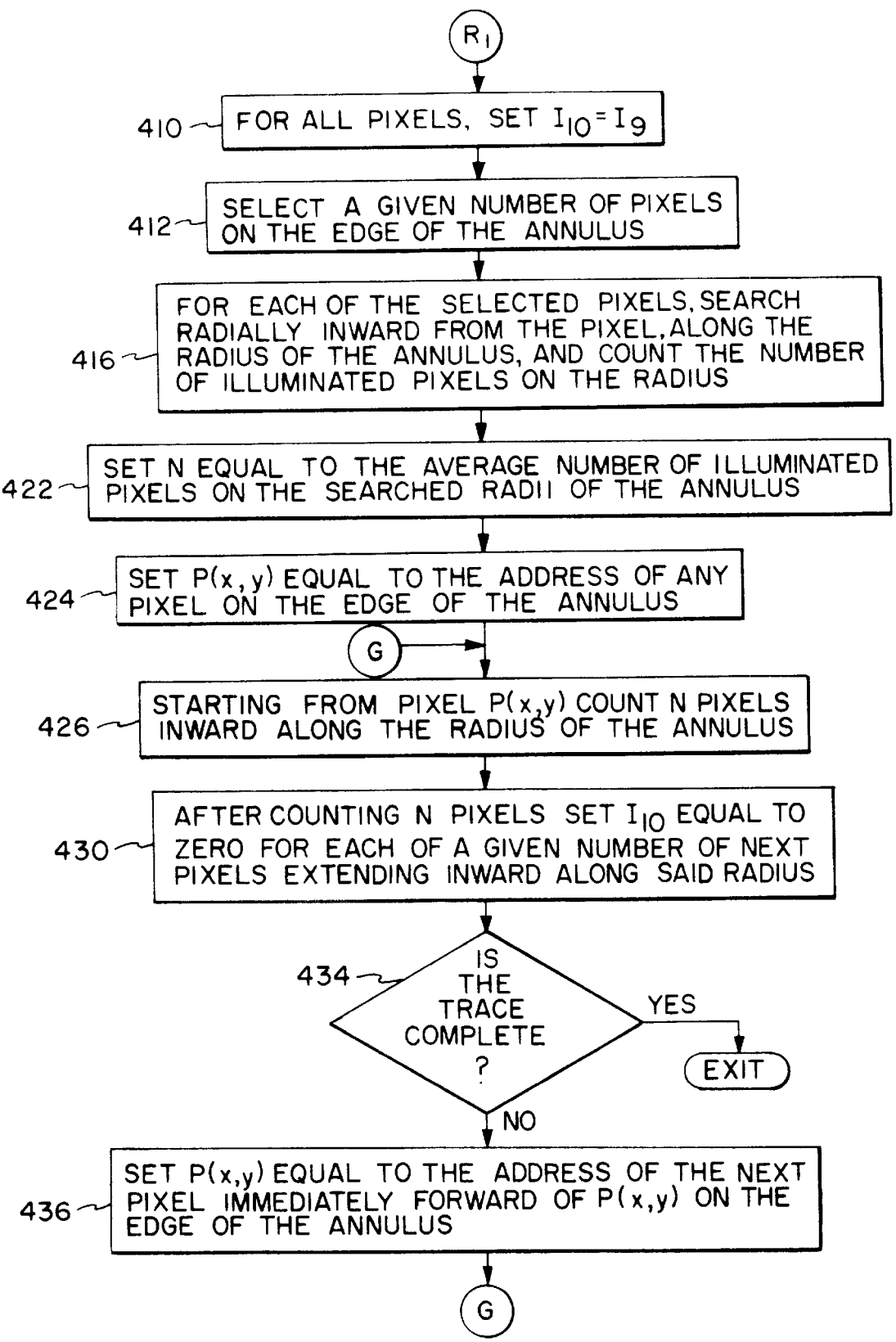
FIG. 30 is a flow chart outlining in greater detail a third main section of the rubber band algorithm.

After routine $R_6$ is completed, the rubber band algorithm proceeds to routine $R_7$, which performs the third pass or trace around the lens edge. As previously discussed, the purpose of this third pass is, in effect, to produce a new set of data values $I_{10}$ that are free of any data associated with any flaws in the lens that are just inside the outside edge of the lens. FIG. 30 shows routine $R_7$ in greater detail; and this routine, generally, is comprised of three parts. In the first part, the $I_{10}$ value for each pixel is set equal to the $I_9$ value for the pixel; in the second part, an average edge thickness value, N, is calculated for the outside edge 164 of annulus 162; and in the third part, the $I_{10}$ values of the pixels in a given range further inside of that average edge thickness are set to zero.

More specifically, at step 410 of routine $R_7$, the $I_{10}$ value for each pixel is set equal to the $I_9$ value for the pixel. Next, with reference to FIGS. 30 and 31, at step 412, a given number of pixels, shown at 414a–e in FIG. 31, on the extreme outside edge 150a of annulus 150 are selected. Then, at step 416, routine $R_7$ counts the number of illuminated pixels on each of the radii, shown at 420a–e in FIG. 31, of the lens image that passes through the pixels 414a–e. For instance, the routine may count the pixel on the extreme outside edge of the annulus as the first pixel, and then search radially inward from that pixel, and increase that count value by one for each illuminated pixel on that radius. At step 422, the average number of illuminated pixels per radius is calculated; and this may be done, for example, simply by dividing the total number of counted illuminated pixels by the number of radial scans made. Typically, this average value is not a whole number, and thus preferably that average value is then increased to the next largest whole number.

Figure 32:
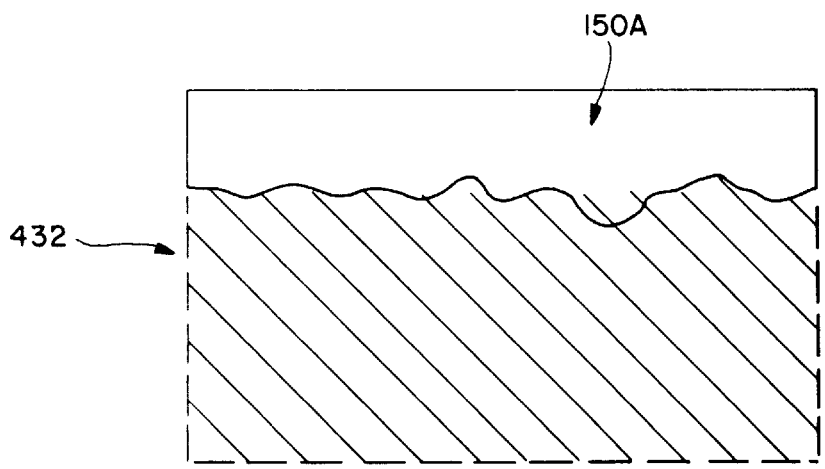

In the next part of routine $R_7$, a third pass is made around the outside edge 150a of annulus 150. To start this pass, any pixel on that edge is selected as the starting pixel P(x, y), as indicated at step 424 in FIG. 30. Then, as represented by steps 426 and 430, the $I_{10}$ values for selected pixels radially inward of the average edge thickness, are set to zero. More specifically, at each pixel on the outside edge of annulus 162, the routine counts N number of pixels radially inward along the radius of the lens. Then, for each of a given number of pixels further radially inward along that radius, the $I_{10}$ value of the pixel is set to zero. With reference to FIG. 32, these steps of the routine, in effect, set to zero the $I_{10}$ values of the pixels in the cross hatched area 432.

At step 434 of Routine $R_7$, a check is made to determine if this third pass around the image of the lens edge is complete, and any suitable subroutine may be invoked to do this. For instance, if the pixel selected as the starting pixel for this pass is the top pixel in file $f_3$, then the pass may be considered as complete after the routine has performed steps 426 and 430 for the bottom pixel on that file. Alternatively, a separate list of the addresses of the pixels used in steps 426 and 430, of routine $R_7$ may be made; and each time a pixel address is added to that list, the list can be checked to see if the new address being added is already on the list. If an address value that is added to list is already on that list, then the third pass around the image of the lens edge is considered to be complete.

If, at step 434, this third pass around the lens image is not complete, then at step 436, the address of pixel P(x, y) is set equal to the address of the pixel that is, clockwise, next to the current pixel P(x, y) along the outside edge 150a of annulus 150. For example, this address may be taken from file $f_3$; and at step 436, the address of pixel P(x, y) may simply be set equal to the address on that file that is next to the current pixel address. Then, the routine $R_7$ returns to step 426, and steps 426, 430, and 434 are repeated for the new pixel address P(x, y).

After this third pass around the image of the lens edge is completed, processor 64 exits routine $R_7$ and the rubber band algorithm terminates.

After the rubber band algorithm is finished, a number of further operations are performed, the general objective of which is to emphasize any irregularities in the lens under consideration or inspection, thereby to make it easier to identify those irregularities subsequently.

The first of these procedures, referred to as a fill-in procedure, is to establish a further set of data values $I_{11}$ for the pixels in array 46, and which may be used to identify pixels in any irregularities in, on, or adjacent the outside edge of annulus 150. More specifically, with reference to FIG. 33, these data values are used to identify pixels in (i) any gaps in the lens edge, such as shown at 436, (ii) any irregularities inside the lens edge, such as shown at 440, (iii) any extra pieces on the lens edge, such as shown at 442 and (iv) the pixels between any extra pieces and the adjacent line segments $L_3$ and $L_4$ formed at steps 362 and 370 in subroutine $S_3$.

This fill-in procedure comprises a number of more specific operations referred to as MAX, PMAX, MIN, and PMIN, which involve processing a set of base data values associated with the pixels. In a MAX operation, a new data value is established for a given pixel that is equal to the maximum base data value of that pixel's eight immediately adjacent neighbors; and in a PMAX operation, a new data value is established for a given pixel that is equal to the maximum base data value of the four pixels that are immediately to the left, to the right, above, and below the given pixel. In a MIN operation, a new data value is established for a given pixel that is equal to the minimum base data value of that pixel's eight immediate neighbors; and in a PMIN operation, a new data value is established for a given pixel that is equal to the minimum base data value of the four pixels that are immediately to the left, to the right, above, and below the given pixel.

FIGS. 34a through 34e illustrate the MAX, PMAX, MIN, and PMIN operations. More specifically, FIG. 34a shows a 7×7 array of numbers; and each number represents a data value for an associated pixel, with the position of the number in the array corresponding to the address of the associated pixel. Hence, for instance, the data value for the pixel at address (1,1) is 7; the data value for the pixel at address (4,1) is 0; and the data values for the pixels at addresses (4,2), (4,7), and (5,2) are 7, 0, and 0, respectively.

FIG. 34b shows the values produced after a MAX operation has been performed on the whole array of numbers shown in FIG. 34a. Thus, for example, in FIG. 34b, the data value at address (2,6) is 7 because, in FIG. 34a, one of the eight pixels adjacent that pixel address has a value of 7. Similarly, the value at address (6,2) in FIG. 34b is 7 because, in the data set of FIG. 34a, one of the eight pixels adjacent that pixel address has a value of 7. FIG. 34c shows the values produced as a result of a PMAX operation on the whole data set of FIG. 34a; and for instance, the values at addresses (6,3) and (6,4) in FIG. 34c are 7 because, in FIG. 34a, each of these two pixel addresses is immediately to the right of a pixel having a value of 7.

FIGS. 34d and 34e show the values produced after MIN and PMIN operations, respectively, have been performed on the array of values shown in FIG. 34a. For example, in FIG. 34d, the value at address (4,3) is zero because, in FIG. 34a, one of the eight pixels neighboring address (4,3) has a zero value; and in FIG. 34e, the value at address (4,2) is zero because, in FIG. 34a, the pixel immediately to the right of that pixel address has a value of zero.

Figure 35:
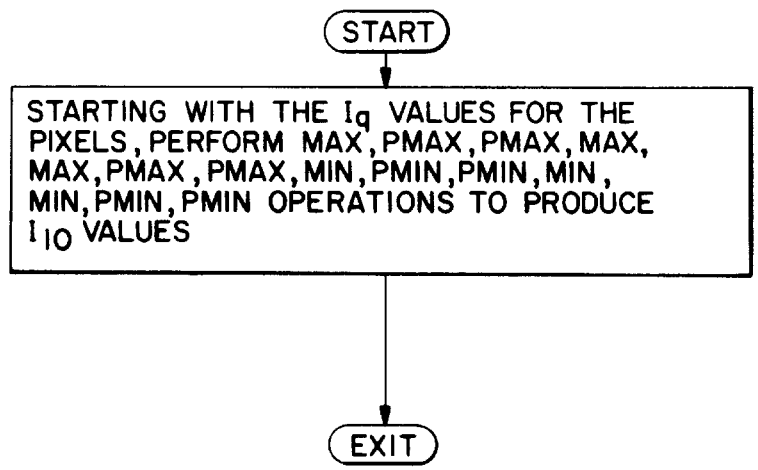
FIG. 35 shows a preferred procedure that is applied to pixel data values to emphasize or highlight possible defects in the edge.

FIG. 35 illustrates a preferred fill-in procedure $R_s$. With reference thereto, the procedure involves 14 separate operations performed on data values for the pixel array 46; and each of these operations is performed, one at a time, over the entire pixel array. These operations are, in order: MAX, PMAX, PMAX, MAX, MAX, PMAX, PMAX, MIN, PMIN, PMIN, MIN, MIN, PMIN, and PMIN. These operations start with the $I_9$ values for the pixels, and the resulting data values, after all 14 operations are completed, are referred to as the $I_{11}$ values.

Figure 33:
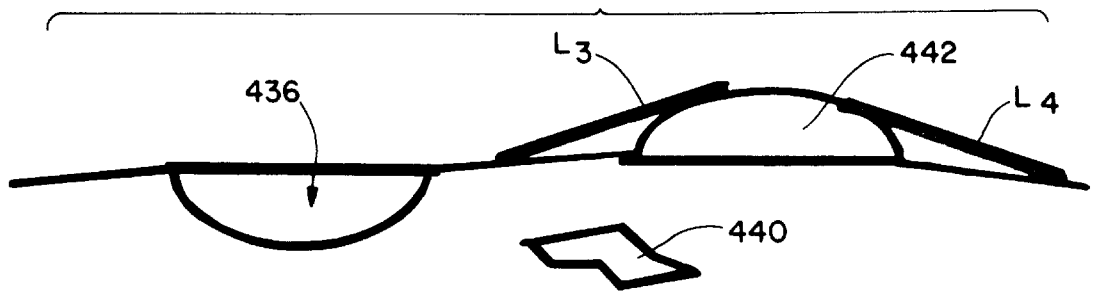
FIG. 33 shows a portion of the outer edge of the annulus, with certain lines added on to that edge.
Figure 36:
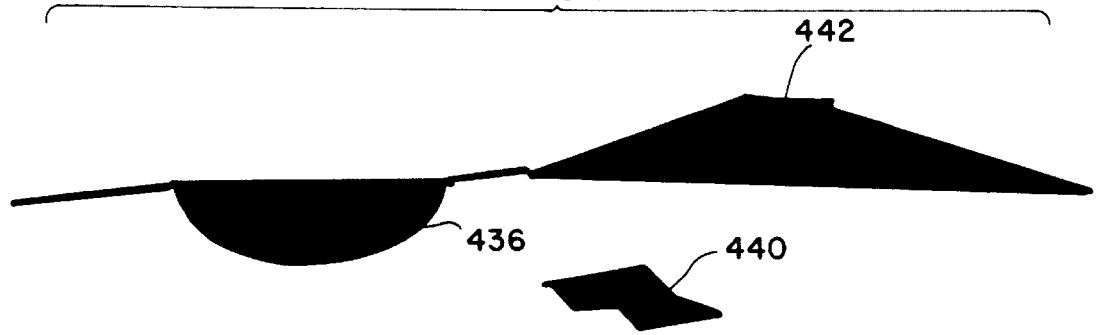
FIG. 36 illustrates the results of the procedure shown in FIG. 35.

The results of these operations are, in effect, to fill in the gaps 436, the extra pieces 442, and the irregularities 440 in, on, or adjacent the outside edge of annulus 150. More specifically, FIGS. 33 and 36 show the same portion of the annulus 150, with the former figure showing the pixels illuminated at their $I_9$ values, and the latter figure showing the pixels illuminated at their $I_{11}$ values. The differences between these two figures show the effect of the fill-in procedure of FIG. 35. In particular, this difference is that for the pixels in the gaps 436, in the extra pieces 442, in irregularities 440, and in the areas between the extra pieces and the line segments $L_3$ and $L_4$, the $I_{11}$ values for these pixels are $T_{max}$ while the $I_9$ values for these pixels are zero.

As will be understood by those of ordinary skill in the art, other specific procedures are known and may be used to produce the desired $I_{11}$ values for the above-described pixels.

After the fill-in operation $R_8$ is completed, processor 64 invokes a second masking procedure $R_9$ to produce a set of pixel illumination values $I_{12}$ that is free of the effect of any light incident on pixel array 46 within a given radius of the center point of the circle fitted to the inside edge 150b of annulus 150 during the decentration test. As discussed in greater detail below, this set of pixel illumination values $I_{12}$ is subsequently used to help identify defects in the interior of the lens—that is, in the area radially inside the inside edge of annulus 150.

The masking procedure $R_9$ employed at this stage of the lens inspection process is very similar to the masking routine $R_3$ shown in FIGS. 19a–19c and 20. The principle difference between these two masking procedures is that the radius of the mask used in procedure $R_9$ is slightly smaller than the radius of the circle fitted to the inside edge of annulus 150, while the radius of the mask used in procedure $R_3$ is slightly larger than the radius of the circle fitted to the outside edge of annulus 150.

Figure 37:
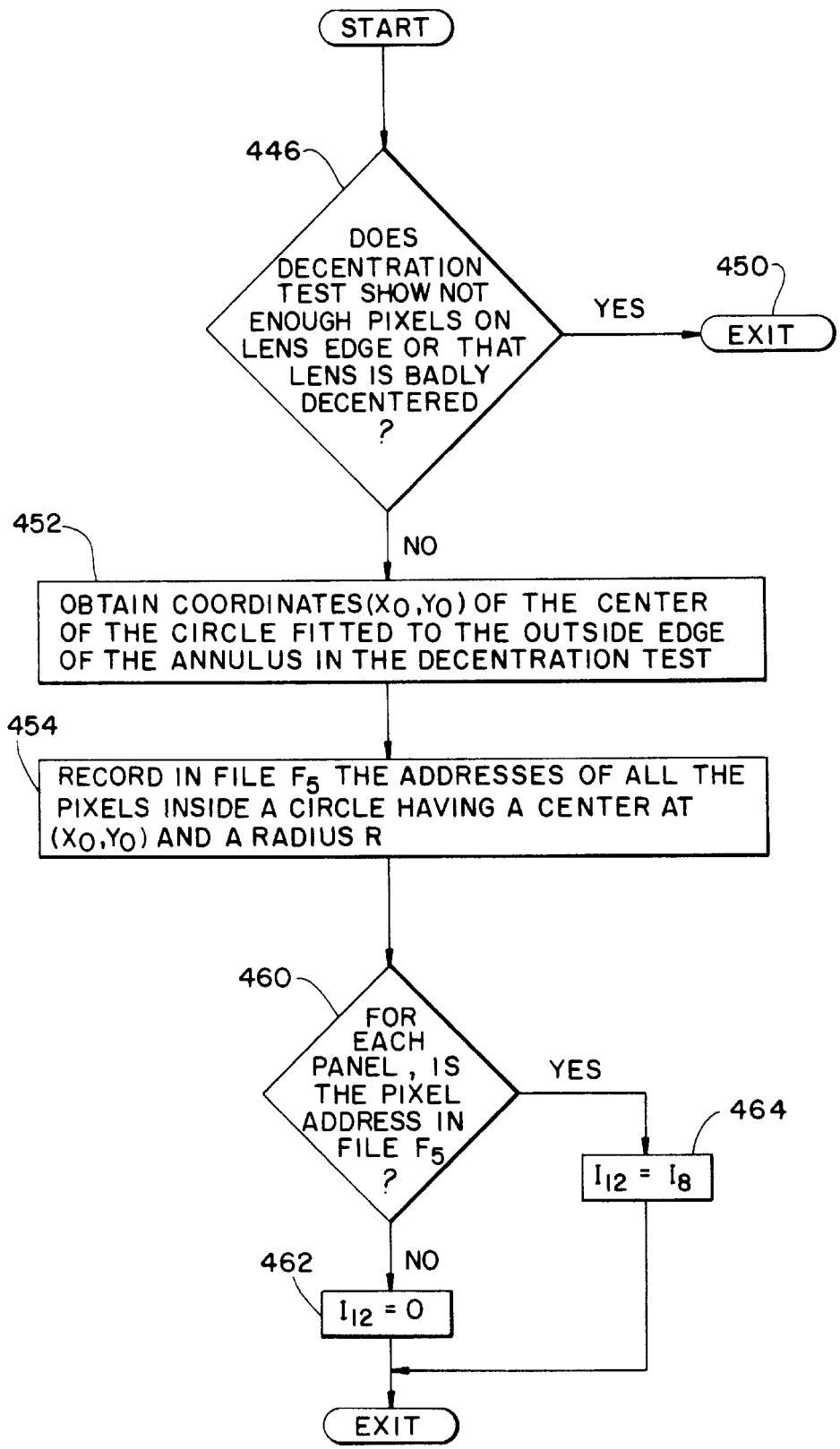
FIG. 37 is a flow chart showing a second masking procedure employed in the processing of the pixel data.

FIG. 37 is a flow chart illustrating a preferred masking routine $R_9$. The first step 446 in this routine is to determine whether at steps 216 or 226 of the decentration test, at least three pixels had been found on the inside edge of annulus 150, or if the ophthalmic lens was found to be badly decentered. If the lens had been found to be badly decentered at either of these two steps of the decentration test, then masking routine $R_9$ itself terminates at step 450.

Figure 38A:
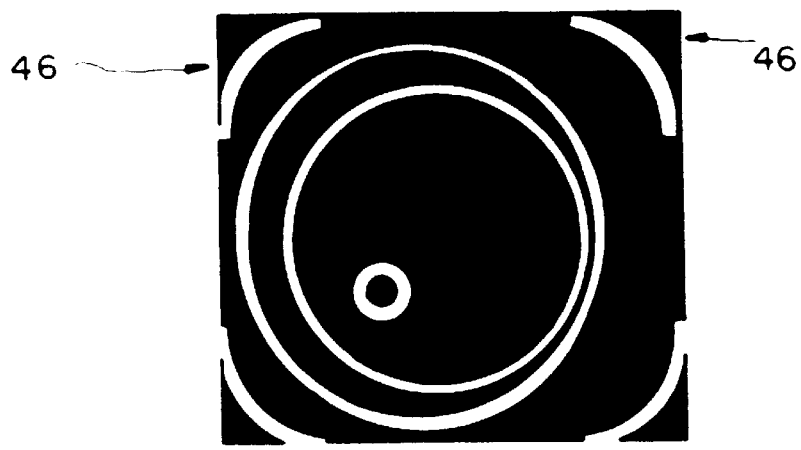
FIGS. 38A–38C pictorially illustrate this second masking procedure and the results thereof.
Figure 38B:
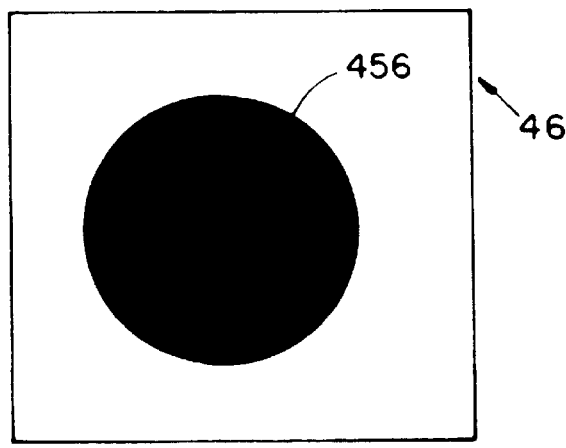
Figure 38C:
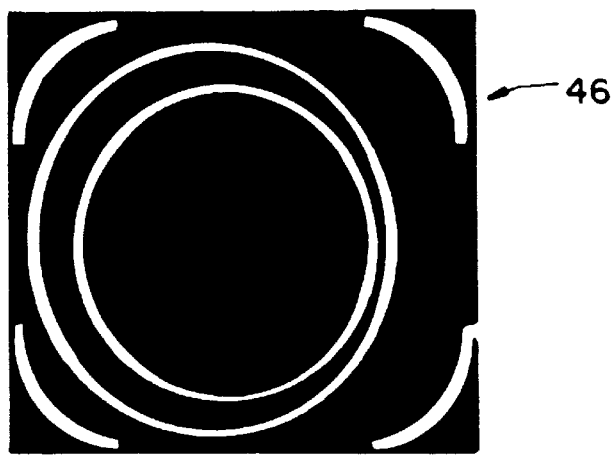

If routine $R_9$ does not terminate at step 450, the routine proceeds to step 452, which is to obtain the coordinate of the center of the circle that had been fitted to the inside edge 150b of annulus 150 during the decentration test. These coordinates had been determined and then stored in processor memory during the decentration test, and these coordinates can be obtained by simply retrieving them from the processor memory. Once these center coordinates are obtained, a mask subroutine is invoked at step 454. With reference now to FIGS. 38a–38c, this subroutine in effect, superimposes over pixel array 46, a circular mask 456 centered on the above-mentioned center coordinates and having a diameter slightly smaller than the diameter of the circle fitted to the inside edge 150b of annulus 150, and then the masking subroutine assigns an $I_{12}$ value to each pixel. In particular, for each pixel outside that mask, the masking subroutine assigns the pixel an $I_{12}$ value equal to the $I_s$ value for the pixel; and for each pixel inside the mask, the masking subroutine assigns the pixel an $I_{12}$ value of zero.

More precisely, at step 452, the coordinate $(x_i, y_i)$ of the above-mentioned center point and a radius value $r_2$, which is selected to be slightly smaller than the radius of the circle fitted to the inside edge of annulus 150, are transmitted to the mask subroutine. Then, at step 454, this subroutine forms a file $f_5$ of the addresses of all of the pixels in array 46 that are within the distance $r_2$ of that center point $(x_i, y_i)$. Then, at step 460, the address of each pixel in array 46 is checked to determine if it is in that file. If the pixel address is in that file, then at step 462, the $I_{12}$ value of the pixel is set to zero; however, if the pixel address is not on the list, then at step 464, the $I_{12}$ value of the pixel is set equal to the $I_8$ value of the pixel.

Numerous specific mask subroutines are well-known in the art for accomplishing the above objective and any suitable subroutine may be employed at step 454 of routine $R_9$.

FIG. 38c shows the pixels of array 46 illuminated at intensities equal to their respective $I_{12}$ values.

Figure 39:
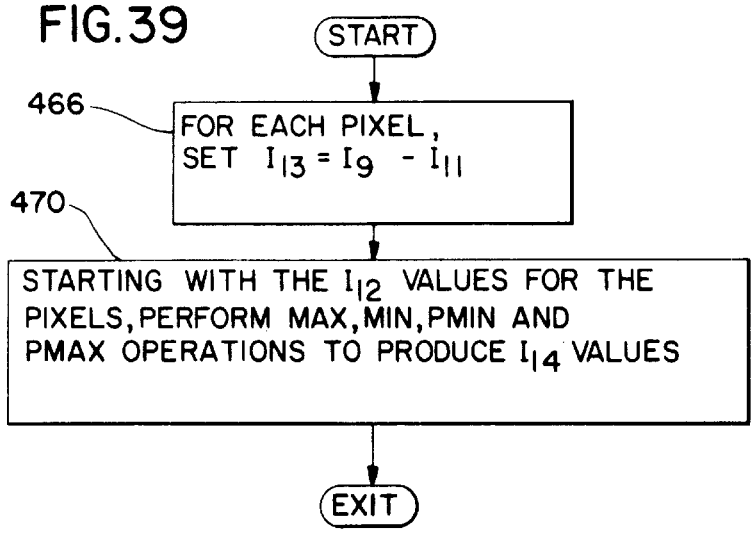
FIG. 39 is a flow chart of a further procedure applied to the pixel data to emphasize further any defects in the lens being inspected.

After this second masking procedure is completed, a further routine $R_{10}$, consisting of a series of operations, is performed to provide a set of pixel illumination values that clearly identify the pixels that are in any irregularity or defect in the lens being inspected. More specifically, the purpose of these further operations is to provide a set of pixel illumination values that is free of any effect produced on array 46 by background noise or light as well as any effect produced on array 46 by the normal or regular edges 150a and 150b of annulus 150. These further operations are shown in the flow chart of FIG. 39.

Figure 40A:
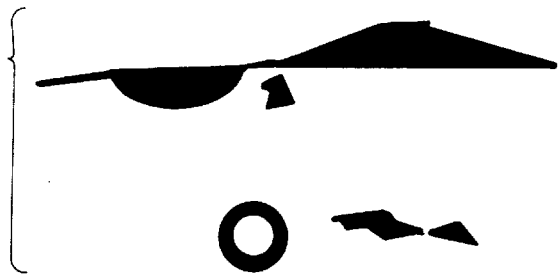
FIGS. 40A–40D pictorially illustrate the operation and results of the procedure outlined in FIG. 39.
Figure 40B:
Figure 40C:
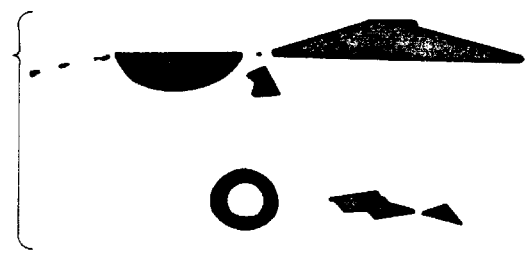

At step 466, a further I value, $I_{13}$, is obtained for each pixel; and in particular, the $I_{13}$ value for each pixel is obtained by subtracting the $I_{12}$ value for the pixel from the $I_{10}$ value for the pixel. FIGS. 40a, 40b, and 40c show the pixels in a portion of annulus 162 illuminated at intensities equal to their $I_{10}$, $I_{12}$, and $I_{13}$ values, respectively; and as can be seen, the practical effect of step 466 is to subtract the image of FIG. 40b from the image of FIG. 40a to produce the image of FIG. 40c.

Figure 40D:
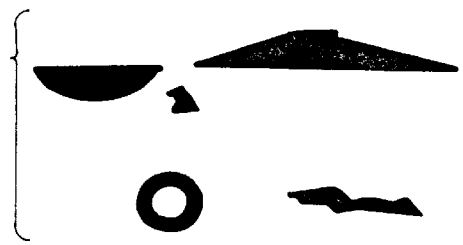

Then, at step 470, an operation, referred to as a clean-up operation, is performed to, in effect, help eliminate spurious illuminated pixels. More particularly, starting with the $I_{13}$ values for the pixels, MAX, MIN, PMIN, and PMAX operations are performed, in that order, on the entire pixel array 46, producing a further set of pixel values referred to as $I_{14}$ values. FIG. 40d shows the pixels of annulus 46 illuminated at intensities equal to their respective $I_{14}$ values; and as can be seen by comparing FIGS. 40c and 40d, the effect of the clean-up operation is simply to eliminate various isolated pixels that, for one reason or another, are illuminated in FIG. 40c.

Figure 41B:
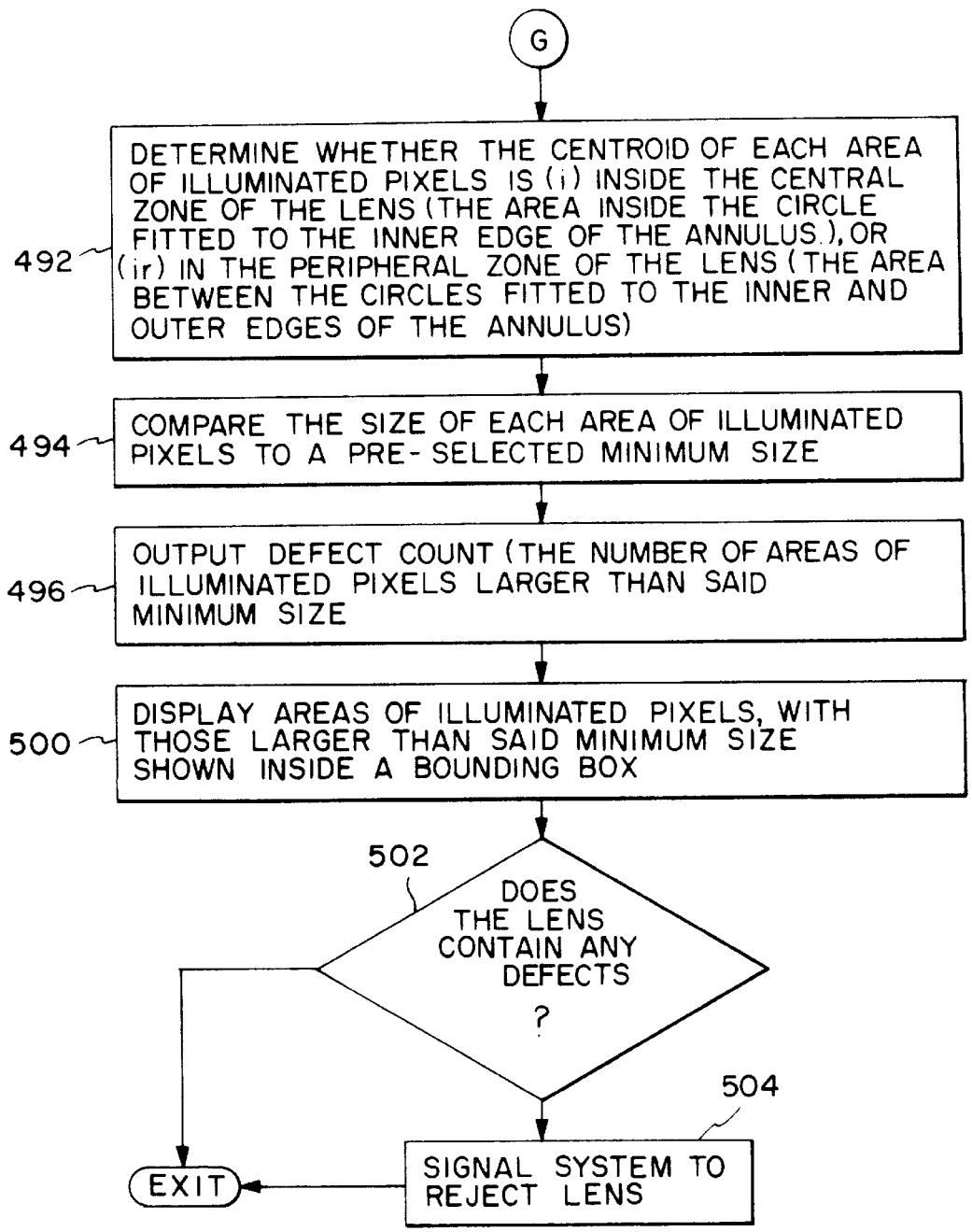

After system 10 has processed the data according to the routines $R_1$–$R_{10}$ described above, a flaw or defect analysis is made, and FIGS. 41a and 41b show a flow chart illustrating a preferred defect detection or analysis routine $R_{11}$. This analysis may be best understood with reference to FIG. 42, which shows the pixels of a portion of annulus 150 illuminated at intensities equal to their respective $I_{14}$ values.

Figure 42:
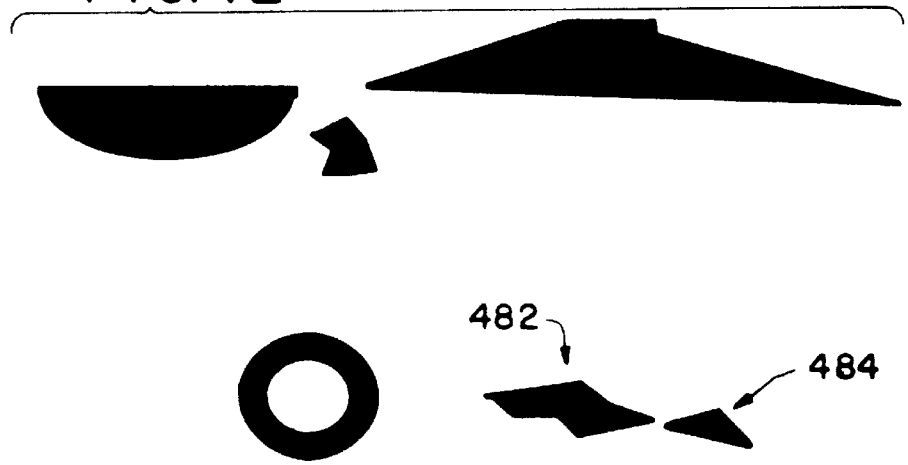
FIG. 42 shows various types of possible defects in the lens.

With reference to FIGS. 41a, 41b, and 42, in the first part of this defect analysis, at steps 472 and 474 of FIG. 41a, a list is made of the addresses of the pixels at the start and at the end of each horizontal series of consecutive illuminated pixels, referred to as a run length. More specifically, processor 64, in effect, scans across each horizontal row of pixels in array 46; and during each scan, each time a series of illuminated pixels is encountered, the addresses of the first and last pixels in that series are recorded in file $f_6$. In the case of a single isolated illuminated pixel—that is, the pixels on the left and right of this illuminated pixels are themselves not illuminated—the address of this illuminated pixels is recorded as both the address of the first and the address of the last pixel in the run length formed by the illuminated pixel.

More precisely, the processor does not in fact scan across an image of the pixel array, but instead compiles the above-mentioned address list by checking the $I_{14}$ values stored in the processor memory for the pixels in array 46.

After file $f_6$ is completed, routine $R_{11}$ invokes a clustering subroutine at step 476 to create a separate file $f_{6a} \ldots f_{6n}$ for each area or group of contiguous illuminated pixels—or, more precisely, for each area or group of contiguous pixels having high $I_{14}$ values. Any suitable clustering subroutine may be employed to do this clustering. After these separate files $f_{6a} \ldots f_{6n}$ are created, then at step 480 the files for illuminated areas that are near to each other, such as those shown at 482 and 484 of FIG. 42, are merged. This may be done, for instance, by checking to determine if any pixel in one illuminated area is within a given number of pixels, such as two or three pixels, of any pixel in another illuminated area. These close illuminated areas are considered as forming, in fact, one illuminated area.

After step 480 is completed, subroutines are invoked at step 486 to compute the area and centroid of, and a bounding box for, each area of illuminated pixels. Numerous subroutines are well-known in the art for performing these computations. Any such suitable subroutines may be employed in routine $R_{11}$, and it is not necessary to describe these subroutines in detail herein.

Next, routine $R_{11}$ determines the general location of each illuminated area. More specifically, at step 490, the address of the centers and the radii of the two circles fitted to the outer and inner edges 150a and 150b of annulus 150 are obtained. These data were determined or found during the decentration test and were then stored in the processor memory, and these data can be obtained by simply retrieving the data from that processor memory. Then, at step 492, processor 64 determines whether -the centroid of each area of illuminated pixels is located (i) inside the central zone of the lens (the area radially inside the circle fitted to the inner edge of the annulus), or (ii) the peripheral zone of the lens (the area of the lens between the two circles fitted to the inner and outer edges of the annulus).

Numerous subroutines are well known for determining whether a centroid of an area is within a first circle or between two generally concentric circles, and it is not necessary to describe these subroutines in detail herein.

Steps 490 and 492 are not necessary to the operation of system 10 in its broadest sense. Preferably, though, these steps are done and the associated data are collected for analysis purposes, and in particular, to help identify where possible irregularities or defects are occurring in the lenses. These data may be helpful in adjusting or refining the procedure or materials used to make the lenses.

After steps 490 and 492 are completed, the processor then determines whether the size of each illuminated area of pixels is sufficiently large to qualify as a flaw or defect for which the lens may be rejected. More specifically, at step 494, the size of each area of illuminated pixels is compared to a preselected size. If that illuminated area is smaller than that preselected size, then the illuminated area is not sufficient to reject the lens. However, if that area of illuminated pixels is larger than the preselected size, then that illuminated area qualifies as a flaw or defect that makes the lens unsuitable for consumer use. This preselected size may be stored, for example, in memory unit 70.

Also, preferably at step 496 a count is maintained of the number of defects found in each lens. This count may also be useful for analyzing the process and materials used to make the lenses.

At step 500, a display is produced on monitor 72 showing the areas of illuminated pixels, with those areas that are larger than the above-mentioned threshold size being shown within a bounding box. Then, at step 502, processor 64 checks to determine if any defects were in fact found in the lens. If a defect had been found, then at step 504 a reject lens signal is generated and transmitted to monitor 72 and printer 76, and the lens may be removed from system 10. If, however, no defect had been found in the lens, then routine $R_{11}$ simply terminates. Subsequently, system 10 operates to move another lens past illuminated subsystem 14 and another pulse of light is transmitted through that other lens. This transmitted light is focused on pixel array 46 and the above-described processing procedure is repeated to determine if this other lens is acceptable for consumer use.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An automated lens inspection system comprising:

a transparent contact lens support;

a light source for illuminating a contact lens located on said transparent contact lens support;

a photographic lens having a field of view positioned over said contact lens support so as to view the contact lens illuminated by said light source;

a pixel means coupled to said photographic lens for obtaining an image of the contact lens viewed by said photographic lens and for generating image data denoting pixel image densities of the image of the contact lens;

a computer programmed to detect abnormalities of the contact lens located on said contact lens support based on the image data generated by said pixel means;

wherein said transparent contact lens support is a transparent plastic lens package which includes a plastic hemispherically shaped member used to transport the contact lens located therein; and wherein said plastic hemispherically shaped member is transparent, said light source directing light through the plastic hemispherically shaped member and then through the contact lens located therein.

2. An automated lens inspection system as claimed in claim 1, further comprising a control subsystem to actuate said light source to thereby generate one light pulse directed at one contact lens when said one contact lens is being viewed by said photographic lens.

3. An automated lens inspection system as claimed in claim 1, wherein said contact lens is in continuous motion when viewed by said photographic lens.

4. An automated lens inspection system as claimed in claim 1, wherein said photographic lens views only one contact lens at a time.

5. An automated contact lens inspection system comprising:

a transport subsystem to move each of a plurality of ophthalmic lenses into a lens inspection position, said transport subsystem including a transparent lens carrier for holding at least one ophthalmic lens, wherein said lens carrier is a transparent plastic lens package;

an illumination subsystem for generating light pulses and directing one of said light pulses to each ophthalmic lens at the lens inspection position for illuminating said lens;

an imaging subsystem for generating a set of signals representing portions of each illuminated ophthalmic lens;

an image processing system for receiving said signals from the imaging subsystem and for processing said signals according to a predetermined program to identify at least one condition of each said lens.

6. An automated contact lens inspection system as claimed in claim 5, wherein said transport subsystem further includes a support assembly for supporting said lens carrier, said support assembly moves the lens carrier and each of the lenses therein to said lens inspection position.

7. An automated contact lens inspection system as claimed in claim 5, wherein said lens carrier comprises a base member and an array of lens inspection cups connected to said base member, wherein at least said lens inspection cups are transparent to light which is transmitted through the lens contained therein.

8. An automated contact lens inspection system as claimed in claim 5, further comprising a control subsystem to actuate the illumination subsystem to generate only one of the light pulses when one of the ophthalmic lenses is in the lens inspection position.

9. An automated contact lens inspection system as claimed in claim 8, wherein the transport subsystem further includes means to generate a trigger signal each time one of the ophthalmic lenses moves into the lens inspection position;

the imaging subsystem includes:
  i) a housing;
  ii) a pixel array disposed in the housing; and
  iii) a shutter having opened and closed positions;

said control subsystem receiving said trigger signal from said transport subsystem and, in response to receiving said signal, the control subsystem being capable of opening the shutter to expose said pixel array; and actuating said illumination subsystem at a predetermined amount of time subsequent said opening of said shutter to thereby generate said light pulse which passes through the lens carrier and the ophthalmic lens at the lens inspection position.

10. An automated contact lens inspection system as claimed in claim 9, wherein said control subsystem further activates the transport subsystem to sequentially align one of the ophthalmic lenses on said lens carrier into the lens inspection position.

11. An automated contact lens inspection system as claimed in claim 5, wherein said imaging subsystem employs dark-field illumination to detect a said condition in said lens by forming an image of features of the ophthalmic lens that scatter or reflect light transmitted through the lens.

12. An automated contact lens inspection system as claimed in claim 5, wherein said illumination subsystem includes a light source for generating collimated white light pulses.

13. An automated contact lens inspection system as claimed in claim 5, wherein said lens carrier carrying said ophthalmic lens is filled with a fluid solution.

14. An automated contact lens inspection system as claimed in claim 5, wherein said lens is in continuous motion when a light pulse illuminates said lens at the lens inspection position.

* * * * *